US012425149B2

(12) United States Patent
Lin et al.

(10) Patent No.: US 12,425,149 B2
(45) **Date of Patent: *Sep. 23, 2025**

(54) SIGNALING CONSIDERATION FOR NEW RADIO POSITIONING WITH DISJOINT BANDWIDTH SEGMENTS

(71) Applicant: QUALCOMM Incorporated, San Diego, CA (US)

(72) Inventors: Yih-Hao Lin, San Diego, CA (US); Srinivas Yerramalli, San Diego, CA (US); Xiaoxia Zhang, San Diego, CA (US); Alexandros Manolakos, Escondido, CA (US); Lorenzo Ferrari, Castro Valley, CA (US); Sony Akkarakaran, Poway, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,889

(22) Filed: Nov. 17, 2023

(65) Prior Publication Data

US 2024/0089041 A1 Mar. 14, 2024

Related U.S. Application Data

(63) Continuation of application No. 17/393,184, filed on Aug. 3, 2021, now Pat. No. 11,848,879.

(Continued)

(51) Int. Cl.

*H04L 5/00* (2006.01)
*H04W 64/00* (2009.01)

(52) U.S. Cl.

CPC ............ *H04L 5/0041* (2013.01); *H04L 5/001* (2013.01); *H04L 5/0048* (2013.01); *H04L 5/0098* (2013.01); *H04W 64/003* (2013.01)

(58) Field of Classification Search

CPC ..... H04L 5/0041; H04L 5/001; H04L 5/0048; H04L 5/0098; H04W 64/003

See application file for complete search history.

(56) References Cited

U.S. PATENT DOCUMENTS

| | | | |
|---|---|---|---|
| 11,848,879 B2 * | 12/2023 | Lin | ....................... H04L 5/0041 |
| 2016/0223639 A1 | 8/2016 | Davydov et al. | |

(Continued)

FOREIGN PATENT DOCUMENTS

| | | |
|---|---|---|
| CN | 109479278 A | 3/2019 |
| CN | 116034557 A | 4/2023 |

(Continued)

OTHER PUBLICATIONS

Intel Corporation: "Further Discussion NR PRS RSTD Requirements", 3GPP draft, 3GPP TSG-RAN WG4 Meeting # 95-e, R4-2006556, 3rd Generation Partnership Project (3GPP), Mobile Competence Centre, 650, Route Des Lucioles, F-06921, Sophia-Antipolis Cedex, France, vol. RAN WG4, No. Electronic Meeting, May 25, 2020-Jun. 5, 2020, May 15, 2020 (May 15, 2020), XP051883633, 18 pages, p. 6, paragraph 3.c figure 4.

(Continued)

*Primary Examiner* — Justin Y Lee

(74) *Attorney, Agent, or Firm* — QUALCOMM Incorporated

(57) ABSTRACT

Disclosed are systems, methods, and non-transitory media for providing signaling consideration for wireless positioning with disjoint bandwidth segments. For instance, one or more indications of a preferred bandwidth configuration can be transmitted by a user equipment. Based on the one or more indications, the user equipment can receive a positioning configuration that indicates disjoint bandwidth segments containing a positioning reference signal based on the preferred bandwidth configuration. In response, the user equipment can then determine one or more positioning measurements based on the positioning reference signal in the disjoint bandwidth segments.

30 Claims, 17 Drawing Sheets

1300

Transmit, By A User Equipment, One Or More Indications Of A Preferred Bandwidth Configuration
1302

Receive, At The User Equipment, A Positioning Configuration Indicating Disjoint Bandwidth Segments Containing A Positioning Reference Signal Based On The Preferred Bandwidth Configuration
1304

Determine, At The User Equipment, One Or More Positioning Measurements Based On The Positioning Reference Signal In The Disjoint Bandwidth Segments
1306

Related U.S. Application Data

(60) Provisional application No. 63/063,933, filed on Aug. 10, 2020.

(56) References Cited

U.S. PATENT DOCUMENTS

| | | | |
|---|---|---|---|
| 2019/0090092 | A1 | 3/2019 | Hwang et al. |
| 2020/0235877 | A1 | 7/2020 | Manolakos et al. |
| 2022/0045811 | A1 | 2/2022 | Lin et al. |

FOREIGN PATENT DOCUMENTS

| | | | |
|---|---|---|---|
| WO | 2020067848 | A1 | 4/2020 |
| WO | 2020146839 | | 7/2020 |
| WO | 2022031974 | A1 | 2/2022 |

OTHER PUBLICATIONS

International Preliminary Report On Patentability—PCT/US2021/044565—The International Bureau of WIPO—Geneva, Switzerland—Feb. 23, 2023.

International Search Report and Written Opinion—PCT/US2021/044565—ISA/EPO—Nov. 12, 2021.

Vivo: "Remaining Issues on DL RS Design for NR Positioning", 3GPP TSG RAN WG1 #99, R1-1912044, 3rd Generation Partnership Project, Mobile Competence Centre, 650, Route Des Lucioles, F-06921 Sophia-Antipolis Cedex, France, vol. RAN WG1, No. Reno, USA, Nov. 11, 2019-Nov. 22, 2019, Nov. 9, 2019, 13 Pages, XP051823172, p. 7.9.10, paragraph [02.2] - [02.4], paragraph [02.6]., p. 2, paragraph 2.1—p. 4, paragraph2.2 p. 7, paragraph 2.3, p. a. paragraph 2.4, p. 11, paragraph 2.10, figures 1-9.

Intel Corporation: "Further Discussion on NR PRS RSTD Requirements", 3GPP TSG-RAN WG4 Meeting # 95-e, R4-2006556, Electronic Meeting, May 25-Jun. 5, 2020, May 15, 2020, 20 Pages.

Qualcomm Incorporated: "Potential Enhancements for NR Rel-17 Positioning", 3GPP TSG RAN WG1 #102-e, R1-2006810, e-Meeting, Aug. 17-28, 2020, Aug. 8, 2020, pp. 1-21.

VIVO: "Remaining issues on DL RS design for NR positioning", 3GPP TSG RAN WG1 #99, R1-1912044, Reno, USA, Nov. 18-22, 2019, Nov. 9, 2019, 13 Pages.

CMCC: "Discussion on Potential Positioning Enhancements", R1-2006216, 3GPP TSG RAN WG1 #102-e e-Meeting, Aug. 17-28, 2020, 6 Pages.

Huawei, et al., "DL PRS Design for NR Positioning", 3GPP TSG RAN WG1 Meeting #98, R1-1908114, Prague, Czech Republic, Aug. 26-30, 2019, pp. 1-11.

* cited by examiner

802

| Component Carrier | Bit | Group |
|---|---|---|
| CC0 | | 1 |
| CC1 | 1 | 1 |
| CC2 | 0 | 2 |
| CC3 | 1 | 2 |

| | 2 Symbols | 4 Symbols | 6 Symbols | 12 Symbols |
|---|---|---|---|---|
| Comb-2 | {0, 1} | {0, 1, 0, 1} | {0, 1, 0, 1, 0, 1} | {0, 1, 0, 1, 0, 1, 0, 1, 0, 1, 0, 1} |
| Comb-4 | NA | {0, 2, 1, 3} | NA | {0, 2, 1, 3, 0, 2, 1, 3, 0, 2, 1, 3} |
| Comb-6 | NA | NA | {0, 3, 1, 4, 2, 5} | {0, 3, 1, 4, 2, 5, 0, 3, 1, 4, 2, 5} |
| Comb-12 | NA | NA | NA | {0, 6, 3, 9, 1, 7, 4, 10, 2, 8, 5, 11} |

FIG. 11

SIGNALING CONSIDERATION FOR NEW RADIO POSITIONING WITH DISJOINT BANDWIDTH SEGMENTS

CROSS-REFERENCE TO RELATED APPLICATIONS

The present application is a continuation of U.S. Non-Provisional application Ser. No. 17/393,184, filed Aug. 3, 2021, entitled "SIGNALING CONSIDERATION FOR NEW RADIO POSITIONING WITH DISJOINT BANDWIDTH SEGMENTS", which claims the benefit of U.S. Provisional Application No. 63/063,933, filed Aug. 10, 2020, entitled "SIGNALING CONSIDERATION FOR NEW RADIO POSITIONING WITH DISJOINT BANDWIDTH SEGMENTS", which are hereby incorporated by reference in their entirety and for all purposes.

FIELD OF THE DISCLOSURE

Aspects of the disclosure relate generally to wireless positioning and the like. In some implementations, examples are described for providing wireless positioning with disjoint bandwidth segments.

BACKGROUND OF THE DISCLOSURE

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for performing wireless positioning with disjoint bandwidth segments. According to at least one example, a method is provided for wireless positioning. The method can include: transmitting, by a user equipment, one or more indications of a preferred bandwidth configuration; receiving, at the user equipment, a positioning configuration indicating disjoint bandwidth segments containing a positioning reference signal based on the preferred bandwidth configuration; and determining, at the user equipment, one or more positioning measurements based on the positioning reference signal in the disjoint bandwidth segments.

In another example, an apparatus for wireless positioning is provided that includes a memory, a transceiver, and a processor (e.g., configured in circuitry) coupled to the memory. The processor is configured to: transmit, via the transceiver, one or more indications of a preferred bandwidth configuration; receive, via the transceiver, a positioning configuration indicating disjoint bandwidth segments containing a positioning reference signal based on the preferred bandwidth configuration; and determine, at the user equipment, one or more positioning measurements based on the positioning reference signal in the disjoint bandwidth segments.

In another example, a non-transitory computer-readable medium is provided that includes stored thereon at least one instruction that, when executed by one or more processors, cause the one or more processors to: transmit one or more indications of a preferred bandwidth configuration; receive a positioning configuration indicating disjoint bandwidth segments containing a positioning reference signal based on the preferred bandwidth configuration; and determine one or more positioning measurements based on the positioning reference signal in the disjoint bandwidth segments.

In another example, an apparatus for wireless positioning is provided. The apparatus includes: means for transmitting one or more indications of a preferred bandwidth configuration; means for receiving a positioning configuration indicating disjoint bandwidth segments containing a positioning reference signal based on the preferred bandwidth configuration; and means for determining one or more positioning measurements based on the positioning reference signal in the disjoint bandwidth segments.

In another example, a method is provided for wireless positioning. The method can include: receiving, at a base station, one or more indications of a preferred bandwidth configuration for signaling consideration transmitted by a user equipment; determining, at the base station, a positioning configuration indicating disjoint bandwidth segments containing a positioning reference signal based on the preferred bandwidth configuration; and providing, by the base station, the positioning configuration indicating the disjoint bandwidth segments to the user equipment for the user equipment to determine one or more positioning measurements based on the positioning reference signal in the disjoint bandwidth segments.

In another example, an apparatus for wireless positioning is provided that includes a memory, a transceiver, and a processor (e.g., configured in circuitry) coupled to the processor. The processor is configured to: receive, via the transceiver, one or more indications of a preferred bandwidth configuration for signaling consideration transmitted by a user equipment; determine a positioning configuration indicating disjoint bandwidth segments containing a positioning reference signal based on the preferred bandwidth configuration; and provide, via the transceiver, the positioning configuration indicating the disjoint bandwidth segments to the user equipment for the user equipment to determine one or more positioning measurements based on the positioning reference signal in the disjoint bandwidth segments.

In another example, a non-transitory computer-readable medium is provided that includes stored thereon at least one instruction that, when executed by one or more processors, cause the one or more processors to: receive one or more indications of a preferred bandwidth configuration for signaling consideration transmitted by a user equipment; determine a positioning configuration indicating disjoint bandwidth segments containing a positioning reference signal based on the preferred bandwidth configuration; and provide the positioning configuration indicating the disjoint bandwidth segments to the user equipment for the user equipment to determine one or more positioning measurements based on the positioning reference signal in the disjoint bandwidth segments.

In another example, an apparatus for wireless positioning is provided. The apparatus includes: means for receiving one or more indications of a preferred bandwidth configuration for signaling consideration transmitted by a user equipment; means for determining a positioning configuration indicating disjoint bandwidth segments containing a positioning reference signal based on the preferred bandwidth configuration; and means for providing the positioning configuration indicating the disjoint bandwidth segments to the user equipment for the user equipment to determine one or more positioning measurements based on the positioning reference signal in the disjoint bandwidth segments.

In another example, a method is provided for wireless positioning. The method can include: receiving, at a user equipment, an indication of phase coherence of a plurality of reference signals associated with a plurality of bandwidth segments; determining whether to aggregate a reference signal associated with each bandwidth segment of the plurality of bandwidth segments based on the indication of the phase coherence; and in response to a determination to aggregate the reference signal associated with each bandwidth segment, determining, at the user equipment, one or more positioning measurements based on an aggregated reference signal from the plurality of bandwidth segments.

In another example, an apparatus for wireless positioning is provided that includes a memory, a transceiver, and a processor (e.g., configured in circuitry) coupled to the processor. The processor is configured to: receive, via the transceiver, an indication of phase coherence of a plurality of reference signals associated with a plurality of bandwidth segments; determine whether to aggregate a reference signal associated with each bandwidth segment of the plurality of bandwidth segments based on the indication of the phase coherence; and in response to a determination to aggregate the reference signal associated with each bandwidth segment, determine one or more positioning measurements based on an aggregated reference signal from the plurality of bandwidth segments.

In another example, a non-transitory computer-readable medium is provided that includes stored thereon at least one instruction that, when executed by one or more processors, cause the one or more processors to: receive an indication of phase coherence of a plurality of reference signals associated with a plurality of bandwidth segments; determine whether to aggregate a reference signal associated with each bandwidth segment of the plurality of bandwidth segments based on the indication of the phase coherence; and in response to a determination to aggregate the reference signal associated with each bandwidth segment, determine one or more positioning measurements based on an aggregated reference signal from the plurality of bandwidth segments.

In another example, an apparatus for wireless positioning is provided. The apparatus includes: means for receiving an indication of phase coherence of a plurality of reference signals associated with a plurality of bandwidth segments; means for determining whether to aggregate a reference signal associated with each bandwidth segment of the plurality of bandwidth segments based on the indication of the phase coherence; and in response to a determination to aggregate the reference signal associated with each bandwidth segment, means for determining one or more positioning measurements based on an aggregated reference signal from the plurality of bandwidth segments.

In another example, a method is provided for wireless positioning. The method can include: determining, at a base station, an indication of phase coherence of a plurality of reference signals associated with a plurality of bandwidth segments; transmitting, by the base station, the indication of the phase coherence of the plurality of reference signals for wireless positioning, each bandwidth segment of the plurality of bandwidth segments being associated with a reference signal of the plurality of reference signals; and receiving, at the base station, one or more positioning measurements based on an aggregated reference signal from the plurality of bandwidth segments, the aggregated reference signal being determined by a user equipment based on the indication of the phase coherence.

In another example, an apparatus for wireless positioning is provided that includes a memory, a transceiver, and a processor (e.g., configured in circuitry) coupled to the processor. The processor is configured to: determine an indication of phase coherence of a plurality of reference signals associated with a plurality of bandwidth segments; transmit, via the transceiver, the indication of the phase coherence of the plurality of reference signals for wireless positioning, each bandwidth segment of the plurality of bandwidth segments being associated with a reference signal of the plurality of reference signals; and receive, via the transceiver, one or more positioning measurements based on an aggregated reference signal from the plurality of bandwidth segments, the aggregated reference signal being determined by a user equipment based on the indication of the phase coherence.

In another example, a non-transitory computer-readable medium is provided that includes stored thereon at least one instruction that, when executed by one or more processors, cause the one or more processors to: determine an indication of phase coherence of a plurality of reference signals associated with a plurality of bandwidth segments; transmit the indication of the phase coherence of the plurality of reference signals for wireless positioning, each bandwidth segment of the plurality of bandwidth segments being associated with a reference signal of the plurality of reference signals; and receive one or more positioning measurements based on an aggregated reference signal from the plurality of bandwidth segments, the aggregated reference signal being determined by a user equipment based on the indication of the phase coherence.

In another example, an apparatus for wireless positioning is provided. The apparatus includes: means for determining an indication of phase coherence of a plurality of reference signals associated with a plurality of bandwidth segments; means for transmitting the indication of the phase coherence of the plurality of reference signals for wireless positioning, each bandwidth segment of the plurality of bandwidth segments being associated with a reference signal of the plurality of reference signals; and means for receiving one or more positioning measurements based on an aggregated reference signal from the plurality of bandwidth segments, the aggregated reference signal being determined by a user equipment based on the indication of the phase coherence.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 11 illustrates an example table of comb-symbol patterns, in accordance with some aspects of the present disclosure.

DETAILED DESCRIPTION

Figure 1:
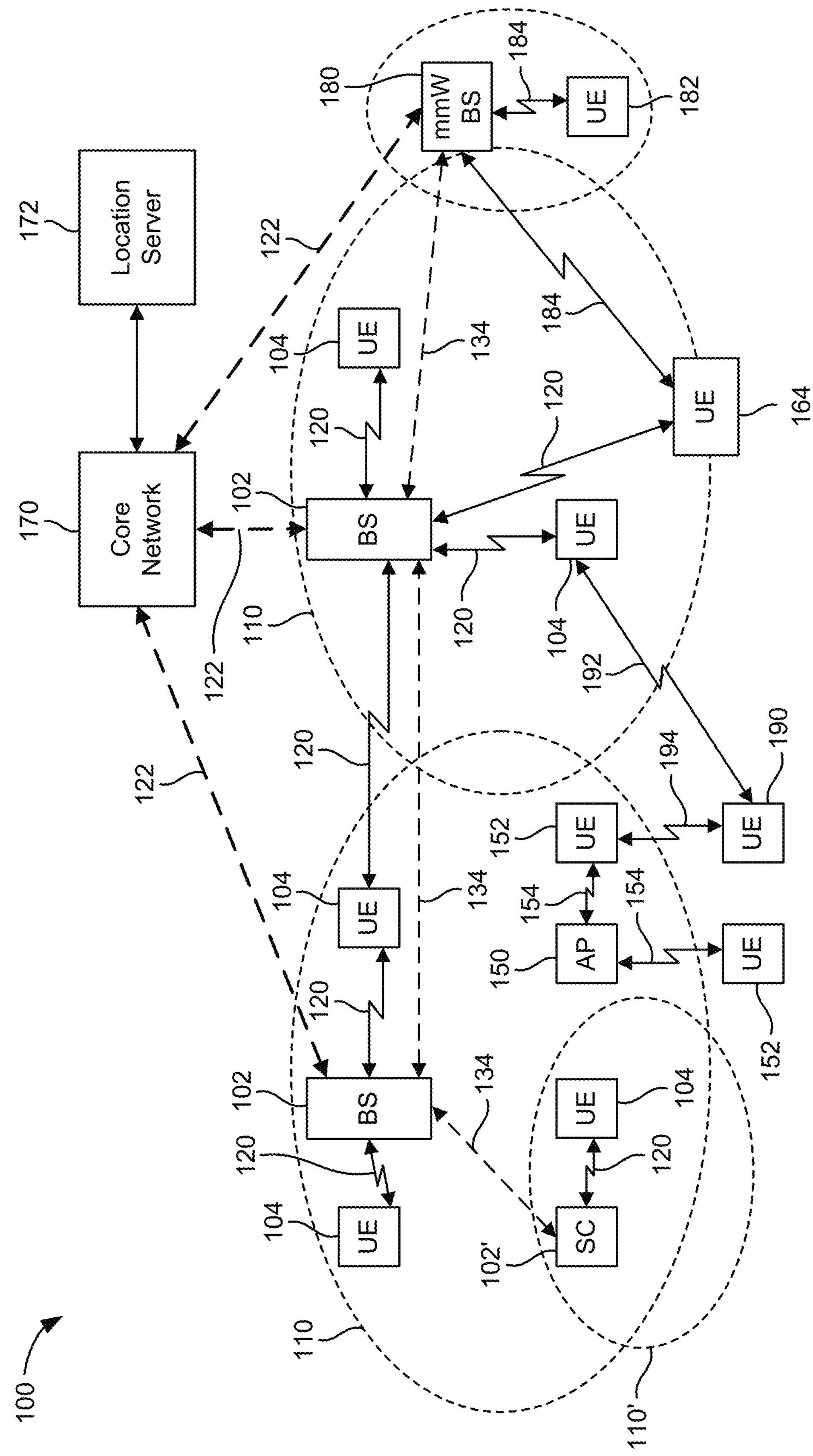
FIG. 1 illustrates an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Systems, apparatuses, processes (also referred to as methods), and computer-readable media (collectively referred to herein as systems and techniques) are described herein for signaling consideration operations for new radio positioning with disjoint bandwidth segments. As described in more detail below, the systems and techniques can utilize disjoint bandwidth segments (e.g., frequencies, frequency bands, frequency layers and resources, component carriers, etc.) in order for a network (e.g., base station, new radio, gNodeB, etc.) to better communicate with one or more user equipment (UE) devices (e.g., wireless devices, mobile devices, vehicles, and/or other UEs) with desired resources and configurations (e.g., when a wider total bandwidth is needed to meet target accuracy requirements). For instance, a UE can process aggregated bandwidth from disjoint frequency bands.

In some examples, a UE can provide information indicating one or more bandwidth implementations and/or algorithms the UE is able to use for processing the aggregated bandwidth from the disjoint frequency bands. For instance, the UE can determine a preferred bandwidth implementation for signaling consideration, and can provide the preferred bandwidth implementation to a base station, location server, and/or other network entity. Signaling considerations for positioning can include which signals, resources, frequency layers, frequencies, frequency bands, bandwidths, and/or component carriers to utilize for positioning purposes (e.g., positioning reference signal resources). The UE can receive an assignment of disjoint bandwidth segments for wireless positioning based on the preferred bandwidth implementation, and can utilize the assignment of the disjoint bandwidth segments on a downlink to receive positioning data from the base station.

In some examples, a UE is configured with multiple frequency layers. For each layer, there can be multiple transmission-reception points (TRPs) associated with a base station, and each TRP can have multiple resources. As described below, a TRP can include one or more antennae of a base station. The base station can provide an indication (e.g., through signaling) to a UE of phase coherence information associated with the multiple frequency layers and/or with resources of the multiple frequency layers. In some examples, the indication of the phase coherence can be provided using various signaling mechanisms, such as by sending a list of indicators (e.g., Boolean indicators), a bitmap (or bit array), one or multiple lists, and/or using other signaling mechanism(s). Using the explicit indication of whether there is phase coherence across frequency layers and/or resources, the UE can group the frequency adjacent layers with coherent phase into one or more larger units of bandwidth, such as before wireless position estimation (e.g., time of arrival (ToA) estimation). Using a larger unit of bandwidth can improve the accuracy of the wireless position estimation.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). As used herein the term traffic channel (TCH) can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or “RF signal” comprises an electromagnetic wave of a given frequency that transports information through the space between a transmitter and a receiver. As used herein, a transmitter may transmit a single “RF signal” or multiple “RF signals” to a receiver. However, the receiver may receive multiple “RF signals” corresponding to each transmitted RF signal due to the propagation characteristics of RF signals through multipath channels. The same transmitted RF signal on different paths between the transmitter and receiver may be referred to as a “multipath” RF signal. As used herein, an RF signal may also be referred to as a “wireless signal” or simply a “signal” where it is clear from the context that the term “signal” refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A “cell” is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term “cell” may refer to either or both of the logical communication entity and the base station that supports it, depending on the context. In addition, because a TRP is typically the physical transmission point of a cell, the terms “cell” and “TRP” may be used interchangeably. In some cases, the term “cell” may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
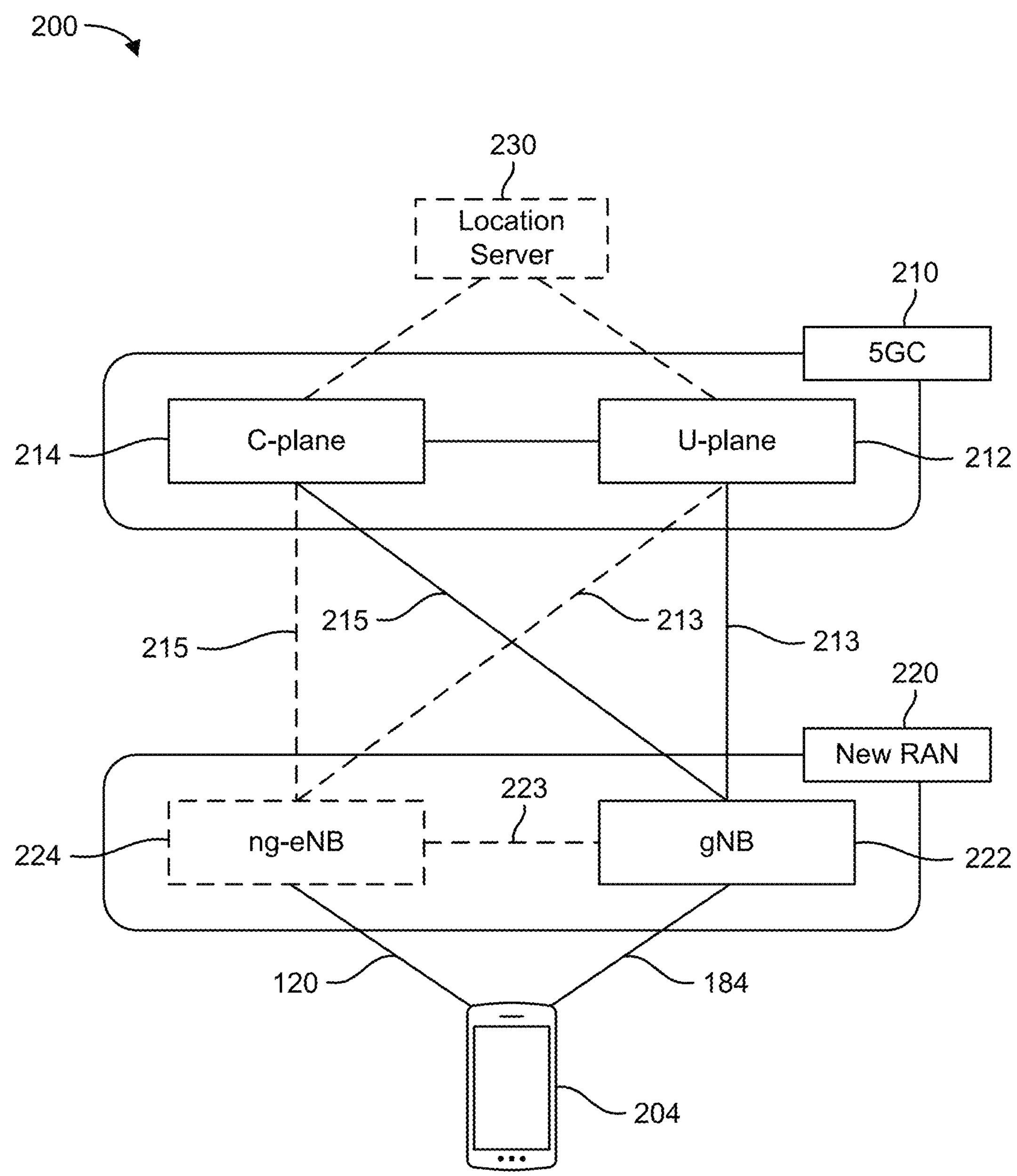
FIGS. 2A and 2B illustrate example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNB s 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
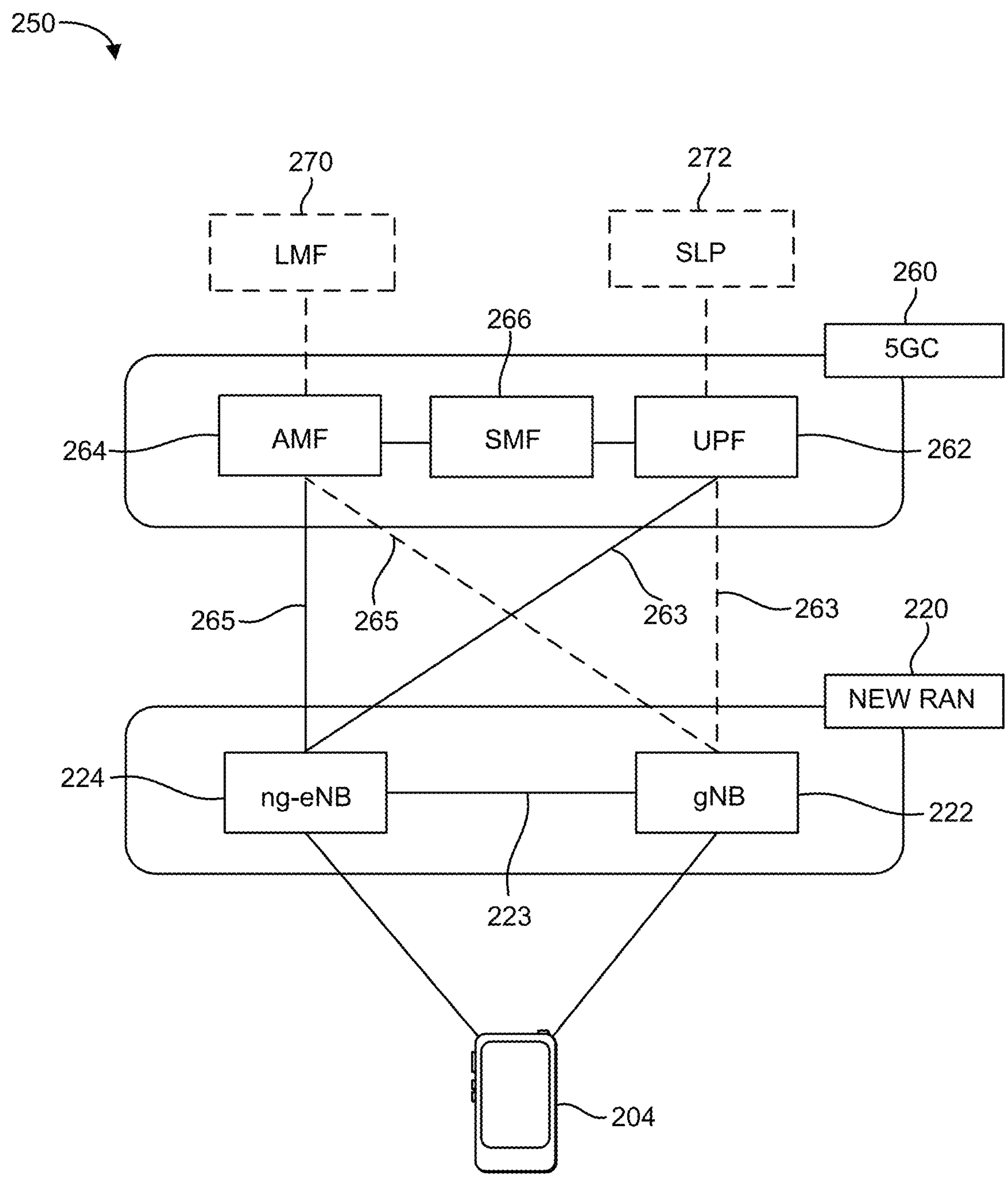

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3:
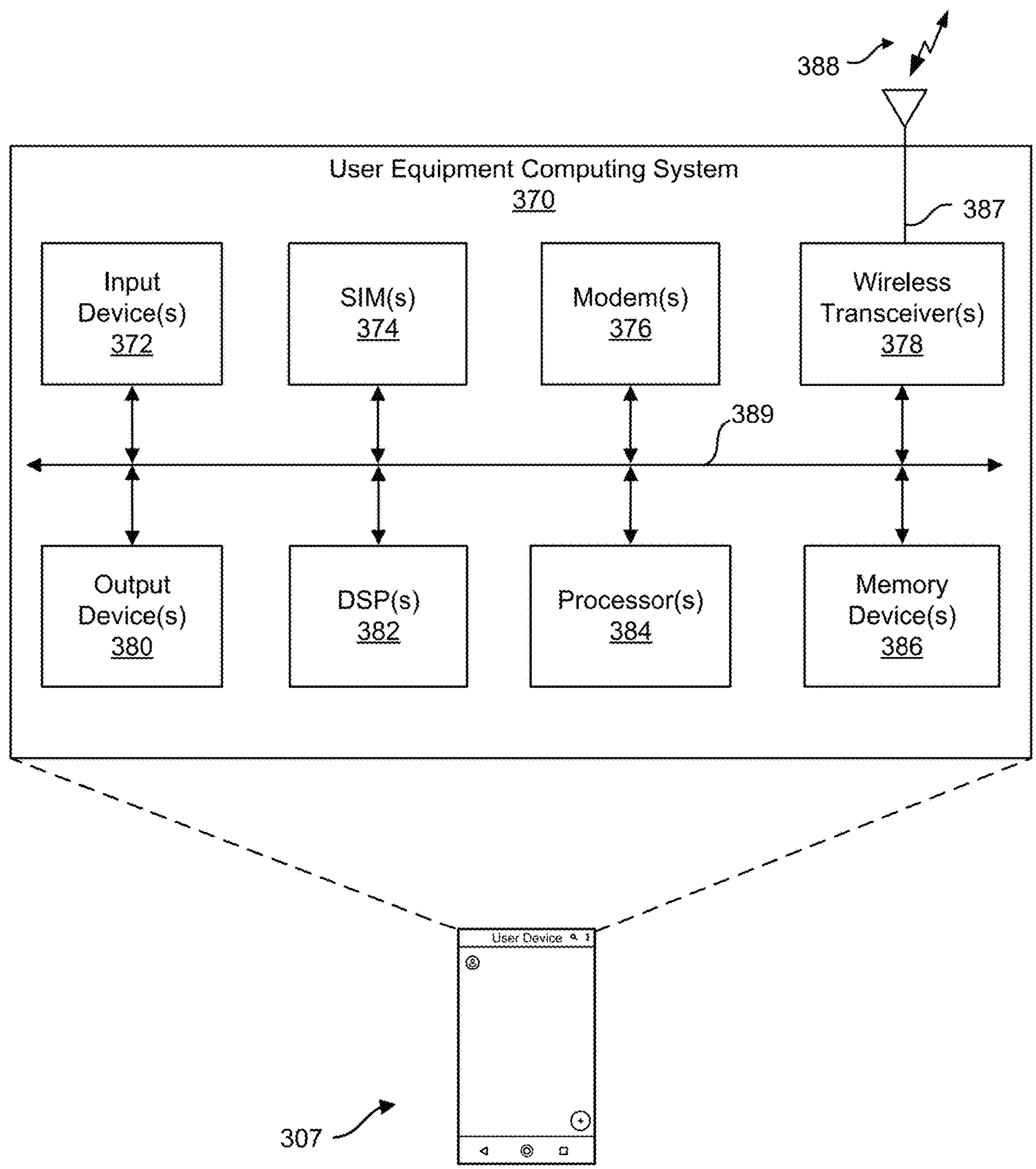
FIG. 3 illustrates an example block diagram of a computing system of a user equipment, in accordance with some aspects of the present disclosure.

FIG. 3 illustrates an example of a computing system 370 of a user equipment (UE) 307. In some examples, the UE 307 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 370 includes software and hardware components that can be electrically coupled via a bus 389 (or may otherwise be in communication, as appropriate). For example, the computing system 370 includes one or more processors 384. The one or more processors 384 can include one or more CPUs, ASICs, FPGAs, APs, GPUs, VPUs, NSPs, microcontrollers, dedicated hardware, any combination thereof, and/or other processing device or system. The bus 389 can be used by the one or more processors 384 to communicate between cores and/or with the one or more memory devices 386.

The computing system 370 may also include one or more memory devices 386, one or more digital signal processors (DSPs) 382, one or more subscriber identity modules (SIMs) 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

The one or more wireless transceivers 378 can transmit and receive wireless signals (e.g., signal 388) via antenna 387 to and from one or more other devices, such as one or more other UEs, network devices (e.g., base stations such as eNBs and/or gNBs, WiFi routers, etc.), cloud networks, and/or the like. As described herein, the one or more wireless transceivers 378 can include a combined transmitter/receiver, discrete transmitters, discrete receivers, or any combination thereof. In some examples, the computing system 370 can include multiple antennae. The wireless signal 388 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 378 may include a radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 388 into a baseband or intermediate frequency and can convert the RF signals to the digital domain.

In some cases, the computing system 370 can include a coding-decoding device (or CODEC) configured to encode and/or decode data transmitted and/or received using the one or more wireless transceivers 378. In some cases, the computing system 370 can include an encryption-decryption device or component configured to encrypt and/or decrypt data (e.g., according to the AES and/or DES standard) transmitted and/or received by the one or more wireless transceivers 378.

The one or more SIMs 374 can each securely store an International Mobile Subscriber Identity (IMSI) number and a related key assigned to the user of the UE 307. The IMSI and the key can be used to identify and authenticate the subscriber when accessing a network provided by a network service provider or operator associated with the one or more SIMs 374. The one or more modems 376 can modulate one or more signals to encode information for transmission using the one or more wireless transceivers 378. The one or more modems 376 can also demodulate signals received by the one or more wireless transceivers 378 in order to decode the transmitted information. In some examples, the one or more modems 376 can include a 4G (or LTE) modem, a 5G (or NR) modem, a Bluetooth™ modem, a modem configured for vehicle-to-everything (V2X) communications, and/or other types of modems. In some examples, the one or more modems 376 and the one or more wireless transceivers 378 can be used for communicating data for the one or more SIMs 374.

The computing system 370 can also include (and/or be in communication with) one or more non-transitory machine-readable storage media or storage devices (e.g., one or more memory devices 386), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 386 and executed by the one or more processor(s) 384 and/or the one or more DSPs 382. The computing system 370 can also include software elements (e.g., located within the one or more memory devices 386), including, for example, an operating system, device drivers, executable libraries, and/or other code, such as one or more application programs, which may comprise computer programs implementing the functions provided by various embodiments, and/or may be designed to implement methods and/or configure systems, as described herein.

As noted above, carrier aggregation is a technique where a UE (e.g., UE 307) can receive and/or transmit on multiple carrier frequencies at the same time, which can increase downlink and uplink data rates. In some cases, the UE 307 may simultaneously utilize a first radio to tune to one carrier frequency (e.g., the anchor carrier) and a second radio to tune to a different carrier frequency (e.g., a secondary carrier). In addition, each of the first radio and the second radio may be tunable to a plurality of different frequencies, one at a time.

Figure 4:
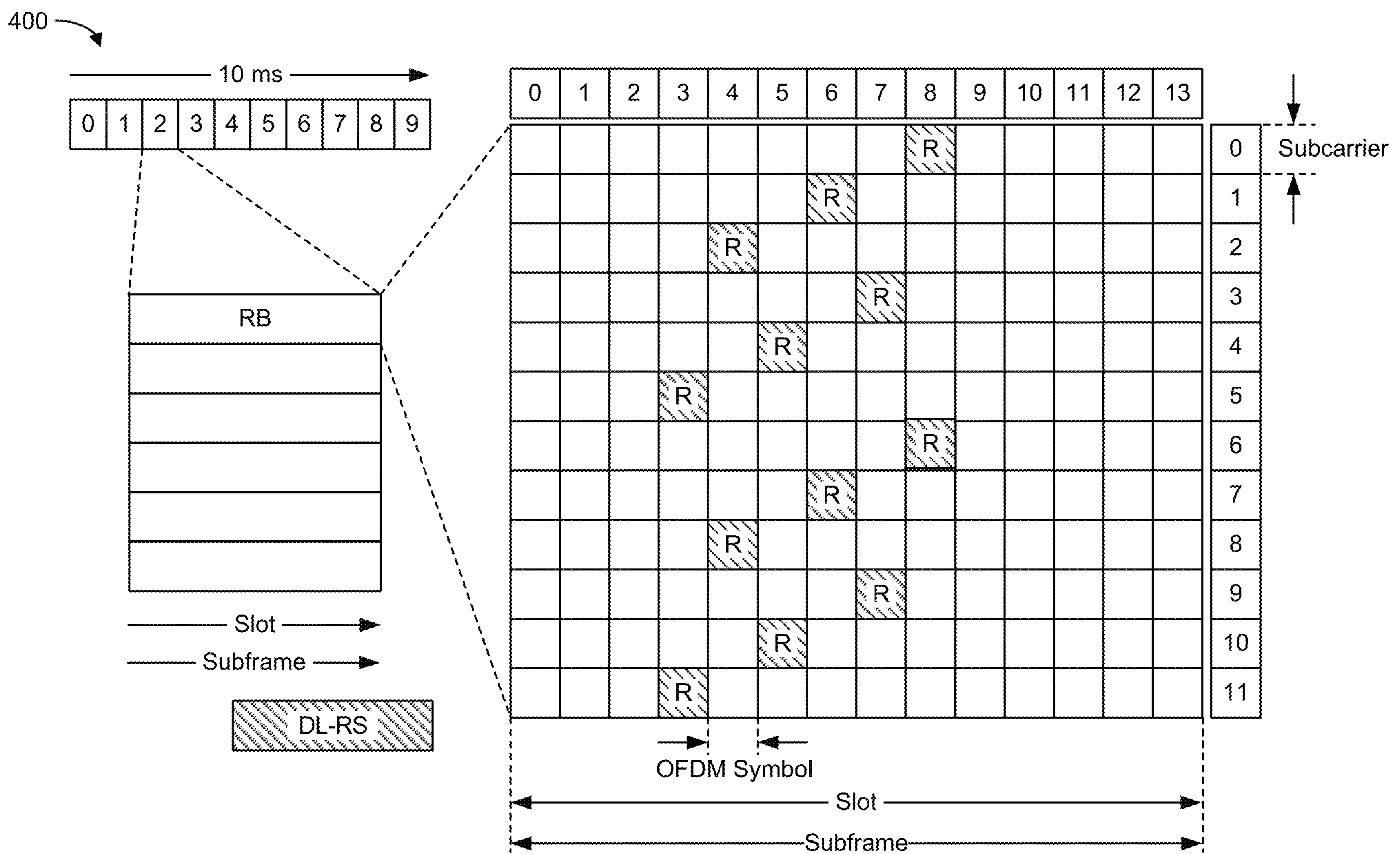
FIG. 4 illustrates an example diagram of a frame structure, in accordance with some aspects of the present disclosure.

Various frame structures may be used to support downlink and uplink transmissions between network nodes (e.g., base stations and UEs). FIG. 4 is a diagram 400 illustrating an example of a downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4 illustrates exemplary locations of REs carrying DL-RS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4 illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

In some implementations, NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230 of FIG. 2A, LMF 270 of FIG. 2B, etc.) may provide assistance data to the UE. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other description of a location. A location estimate may further be defined relative to some other known location or defined in absolute terms (e.g., using latitude, longitude, and/or altitude). A location estimate may include an expected error or uncertainty (e.g., by including an area or volume within which the location is expected to be included with some specified or default level of confidence).

There is a need for techniques to support the high accuracy (horizontal and vertical), low latency, network efficiency (scalability, RS overhead, etc.), and device efficiency (power consumption, complexity, etc.) requirements for commercial positioning uses cases (including general commercial use cases and specifically (I)IoT use cases). For example, with reference to the accuracy requirement, the accuracy of a location estimate depends on the accuracy of the positioning measurements (e.g., ToA, TDoA, etc.) determined based on one or more received positioning reference signals (PRSs). The larger the bandwidth of the PRS, the more accurate the positioning measurements will become.

Figure 5:
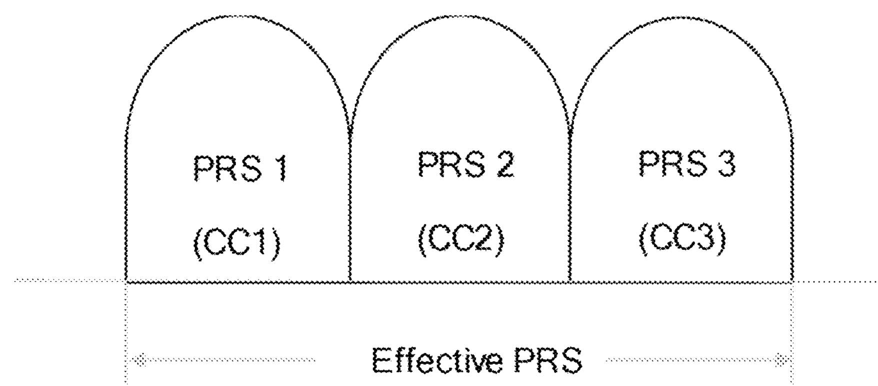
FIG. 5 illustrates an example of a radio frequency signal spanning contiguous component carriers to increase the effective bandwidth of the radio frequency signal, resulting in increased positioning measurement accuracy, in accordance with some aspects of the present disclosure.

As noted above, systems and techniques are described herein for performing multi-frequency layer PRS stitching to increase the bandwidth of a PRS. Multi-frequency layer PRS stitching enables position measurements using PRS resources that span contiguous component carriers. In some cases, the multi-frequency layer PRS stitching can enable position measurements using PRS resources that span non-contiguous frequencies or component carriers (e.g., for devices such as UEs that support a smaller bandwidth but can hop across the bandwidth provided by a gNB or other network entity). For instance, if a UE supports 20 MHz but a gNB supports 100 MHz, the UE can occupy only 20 MHz at a time but can move around the 100 MHz over time. By spanning such contiguous or non-contiguous component carriers, the effective PRS bandwidth can be increased, as shown in FIG. 5, resulting in increased positioning measurement accuracy. For example, a component carrier can be defined as 100 MHz. By using three component carriers, as in the example of FIG. 5, the effective bandwidth of the measured PRS is 300 MHz. Note that when implementing multi-frequency layer PRS stitching, assumptions between the consecutive component carriers need to be defined (e.g., QCL, same antenna port, etc.) so that the effective PRS bandwidth can be increased (both for UL- and DL-PRS). An aggregated PRS includes a collection of PRS resources transmitted from a same TRP such that the UE may assume that the same antenna port is transmitted. Each PRS resource of an aggregated PRS is referred to herein as a PRS component. Each PRS component can be physically transmitted on different component carriers, bands, frequency layers, or different bandwidths on the same band.

Bandwidth is a key resource for achieving higher accuracy in ToA estimation. However, network operators typically do not own wide contiguous portions of available bandwidth. Instead, smaller portions of fragmented carrier bandwidth are typically allocated across multiple carrier bands. Accordingly, the effective aggregation and utilization of bandwidth slices across disjoint bands can enable the ability to perform high precision positioning in wireless networks (e.g., 5G networks). In addition, the ability to aggregate bandwidth across disjoint bands or over multiple measurements in time can enable a faster and more accurate position fixing versus having to repeatedly perform measurements of multiple disjoint bands until a desired accuracy is achieved. In addition, bandwidth aggregation allows carriers to lower costs by buying fragmented spectrums, and enables the use of those spectrums in verticals where high precision and low latency are required, such as in automotive and IIOT use cases, etc.

Figure 6:
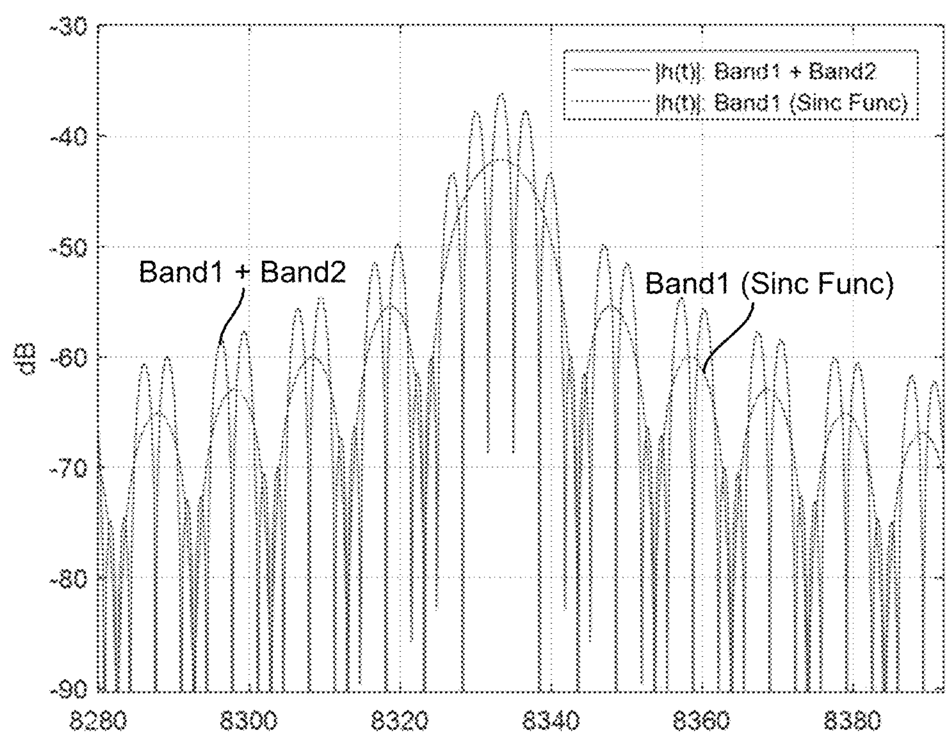
FIG. 6 illustrates an example graph of time domain waveforms for two separate frequency bands, in accordance with some aspects of the present disclosure.

There are issues with time-domain based approaches to determining the ToA of a PRS over non-contiguous bandwidth. For example, it is difficult to distinguish the main lobe from side lobes for channels with more than one tap. This is illustrated in FIG. 6, which is a graph illustrating example time domain waveforms for two separate bands. As can be seen in FIG. 6, while the peak for Band 1 is easily distinguishable, the peak for the combination of Band 1 and Band 2 is not. In addition to time domain issues with identifying the earliest peak for accurate ToA estimation, phase coherence is also an issue.

Figure 7:
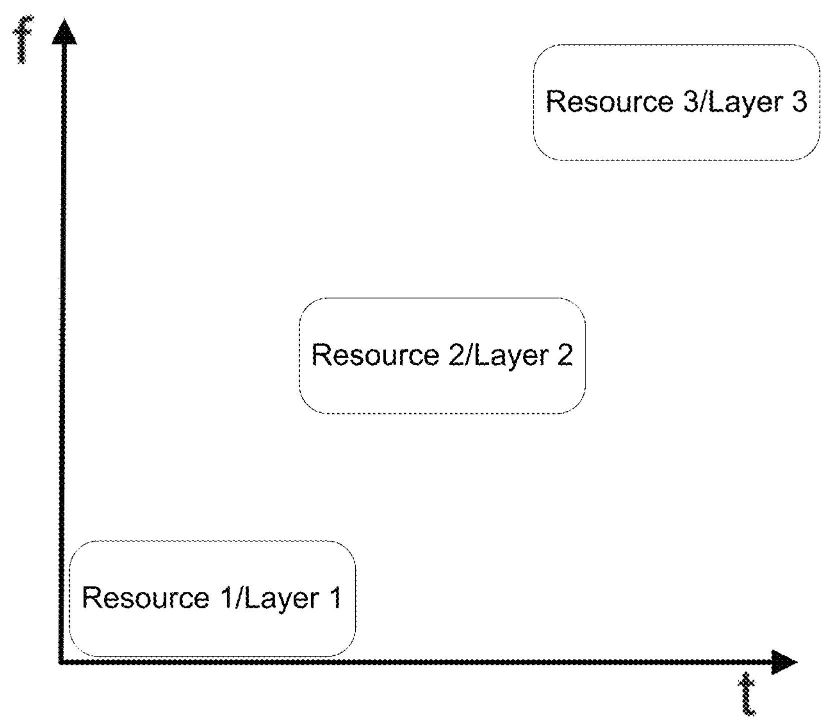
FIG. 7 illustrates an example of a radio frequency (RF) signal that is received on three disjoint frequency layers that are measured in consecutive time periods, in accordance with some aspects of the present disclosure.

Under certain conditions, such as for devices with limited bandwidth support, a UE cannot perform concurrent measurements of resources in different frequency layers. As a result, the timing measurement on each frequency layer is performed in a time-division multiplexing (TDM) fashion, as shown in FIG. 7. Specifically, FIG. 7 illustrates an example of an RF signal (e.g., a PRS) that is received on three disjoint frequency layers that are measured in consecutive, not concurrent, time periods. The plot illustrated in FIG. 7 has time (t) on the x-axis and frequency (f) on the y-axis.

Objectives for high precision positioning can include the development of solutions that can support high accuracy (e.g., horizontal and vertical), low latency, network efficiency (e.g., scalability, reference signal (RS) overhead, etc.), and device efficiency requirements (e.g., power consumption, complexity, etc.) for commercial use cases (including general commercial use cases and IoT specific use cases). Such solutions can be developed by evaluating achievable positioning accuracy and latency in certain scenarios (e.g., Internet-of-Things (IoT) scenarios, etc.) and identifying performance gaps. Other examples include identifying and evaluating positioning techniques, DL/UL positioning reference signals, signaling and procedures for improved accuracy, reduced latency, network efficiency, and device efficiency. Enhancements in positioning techniques can also be prioritized.

In some instances, as described herein, signaling may be required for positioning when utilizing an aggregated bandwidth. Aggregated bandwidth can include bandwidth segments that are joined in the frequency domain. A system and/or UE can utilize advanced processing techniques to aggregate and combine the bandwidth segments, which may include disjoint bandwidth segments. Although the bandwidth segments may be disjointed, the system/network and/or the UE can combine component carriers, frequency bands, and/or resources within frequency bands to combine the disjoint bandwidth segments to improve positioning accuracy. By utilizing the disjoint bandwidth segments, the system/network and UE can achieve higher precision while reducing latency.

In communication or signal processing, converting a wideband frequency domain to the time domain results in a narrow impulse function. The wider the bandwidth in the frequency domain, the narrower the impulse in the time domain. For example, given a wider bandwidth, there are two propagation paths for transmission and reception. One propagation path is line of sight from transmission to reception, while the second propagation path can be a reflection. These two propagation paths can be separated in the time domain by a relative delay. If the separation between these two propagation paths is large enough, the two propagation paths can be distinguished in the time domain. However, when these two paths are close to each other, depending on the width of the impulse function in the time domain, the two propagation paths may be indistinguishable. If the two propagation paths cannot be distinguished, the resolution in the time domain will be poor. As such, improved accuracy can be obtained if there is better resolution in the time domain. Issues may not be present for a wide bandwidth that is completely contiguous. However, in cases when the bandwidth includes disjoint segments as described in the present disclosure, stitching the disjoint segments (e.g., different discrete bands) can allow for the utilization of a wider bandwidth, thereby improving time of arrival estimation accuracy.

Regarding new radio (NR) wireless positioning, a "positioning frequency layer" can be a collection of downlink (DL) positioning reference signal (PRS) resource sets across one or more transmission-reception points (TRPs), which may include the same numerology (e.g., sounding reference signal (SCS) and cyclic prefix (CP) type, the same carrier frequency (e.g., center frequency), and the same starting point (e.g., point-A). The DL PRS resource sets can belong to the same positioning frequency layer while having the same value of DL PRS bandwidth and start physical resource block (PRB). The DL PRS resource sets can also belong to the same positioning frequency layer while having the same numerology (e.g., value of comb size).

At a high level, a frequency layer can include a frequency domain or resource (e.g., a bandwidth) that can be shared across multiple TRPs, and that can be utilized to transmit on a downlink PRS resource. The UE can perform measurements across the bandwidth and derive a channel impulse response based on the channel measurement. The resulting time-domain waveform can be analyzed to identify arrival time of the signal, which can then be used for providing information to a triangulation algorithm to compute the position of the UE. For example, the TRP can utilize the bandwidth to send a signal (e.g., a PRS) to the UE, and the UE can then measure the signal and estimate the arrival time of the signal. One illustrative example of a bandwidth band can be the 400 MHz band. By having a wider effective bandwidth, for example, by aggregating disjoint bandwidth segments, better performance can be achieved when utilizing triangulation algorithms with TOA estimations.

In some examples, the systems and techniques described herein can utilize multi-frequency layer PRS stitching for higher positioning accuracy. Multi-frequency layer PRS stitching can include enabling position measurements using PRS s that span contiguous component carriers (CCs), as illustrated in FIG. 5. Increasing the effective PRS bandwidth can achieve an increase in time of arrival (TOA) measurement accuracy. Proper assumptions between consecutive CCs can be defined (e.g., QCL, same antenna port, etc.) so that the effective PRS bandwidth can be increased (e.g., both for UL and DL PRS).

In some examples, the systems and techniques can stitch non-contiguous CCs to form a disjoint frequency band. Each of the CCs of the disjoint frequency band can be non-contiguous from one another, or one CC can be non-contiguous from other CCs that are contiguous to each other. In some cases, the CCs can be inter-band or intra-band. In cases where antennas are quasi-located, measurements can be taken at different CCs to stitch a wide bandwidth. In some examples, the phase coherence across the CCs can be used to determine which frequencies to combine in a wide bandwidth. For example, if two PRS CCs are not in phase and thus not phase coherent when a positioning measurement is performed (e.g., one measurement for an upper part of a wider bandwidth and another measurement on a lower part of the wider bandwidth), in the time domain (e.g., if the CCs are converted to the time domain) the result will not be a proper impulse response because there is interruption or discontinuity in phase in between the upper part and lower part. In such cases, existing algorithms cannot combine the two measurements from the bandwidth parts that are not in phase and use the combined CCs for positioning. By determining CCs that are phase coherent, a UE or other device can use disjoint or non-contiguous CCs (which have phase coherence) for positioning.

By utilizing the wide bandwidth of disjoint (e.g., non-contiguous) CCs, better resolution and more accurate positioning is possible in the time domain, for example, when utilizing positioning algorithms. In some instances, when the frequency domain channel response is observed, a frequency domain-based algorithm can be utilized to determine which frequencies and CCs are to be stitched in the disjoint frequency band. When the time domain channel response is observed, time domain-based algorithms can be utilized to determine which frequencies and/or CCs are to be stitched in the disjoint frequency band. However, depending on the desired implementation, either type of frequency and/or time domain-based algorithms can be utilized for both domain types.

An example of an algorithm that may be utilized to stitch non-contiguous frequencies and/or CCs is a matrix pencil algorithm. A matrix pencil is used to represent the power delay profile (PDP) of an RF signal in the frequency domain. The PDP of an RF signal indicates the intensity of the RF signal as a function of time delay when it is received through a multipath channel. The frequency domain representation of the PDP of an RF signal using a matrix pencil is given as:

$$X[k] = \sum_{n=1 \ldots r} d_n \exp(-j2\pi k \Delta f \tau_n)$$

where k is the subcarrier index, n is the channel tap index, r is the total number of taps, j is a complex imaginary number, $\tau_n$ is the delay of the n-th path, $d_n$ is the complex amplitude of the n-th path, and $\Delta f$ is the subcarrier spacing.

The matrix representation is:

$$X = V_{L \times r} \times d$$

where:

$$V_{L \times r} = \begin{pmatrix} 1 & 1 & 1 & \cdots & 1 \\ Z_1 & Z_2 & Z_3 & \cdots & Z_r \\ Z_1^2 & Z_2^2 & Z_3^2 & \cdots & Z_r^2 \\ \vdots & \vdots & \vdots & \ddots & \vdots \\ Z_1^{L-1} & Z_2^{L-1} & Z_3^{L-1} & \cdots & Z_r^{L-1} \end{pmatrix}, d = \begin{pmatrix} d_1 \\ d_2 \\ d_3 \\ \vdots \\ d_r \end{pmatrix}$$

and where:

$$z_n = \exp(-j2\pi \Delta f \tau_n), z = \begin{pmatrix} z_1 \\ z_2 \\ z_3 \\ \vdots \\ z_r \end{pmatrix}, X = (X[0], X[1], \ldots, X[L-1])^T$$

In the above equations, $V_{L \times r}$ is the Vandermonde Matrix.

An aggregated PRS includes a collection of PRS resources transmitted from the same TRP such that the UE may assume that the same antenna port is transmitted. Each PRS resource of an aggregated PRS can be referred to as a PRS component. Each PRS component can be physically transmitted on different component carriers, bands, frequency layers, and/or on a different bandwidth but on the same band.

Bandwidth is a key component to high positioning accuracy. However, due to the scarcity of frequency resources, the total bandwidth owned by an operator is usually fragmented. To fully utilize the bandwidth available across disjoint bands, the operator can process the measurements over the aggregated bandwidth jointly based on the systems and techniques described here. As described herein, different algorithms can be implemented by different UEs to provide better performance. In some cases, a UE can have different UE preferences based on a particular algorithm used by the UE or to provide better performance. Such preferences can include preferences for PRS resource configurations (e.g., band combination, numerology, comb-symbol pattern, etc.), preferences regarding ability to utilize phase coherence across disjoint resources, among others.

With the ability of utilizing UE preferences and capabilities as described herein, a network can better communicate with the UE with the desired resource and configuration when a wider total bandwidth is needed to meet target accuracy requirements. New signaling information that can be provided according to the systems and techniques described herein can include UE preferences of PRS resource configurations over disjoint bandwidths, an ability of a UE to utilize phase coherence between frequency-disjoint PRS resources are further discussed in the present disclosure, and/or other information. With the new signaling information communicated to the network, location management function (LMF) and gNB can better serve the UE when disjoint bandwidths are allocated for higher accuracy.

Each frequency layer carrying one or more PRS resources may be disjoint from other frequency layers carrying the one or more PRS resources, or different groups of frequency layers may be contiguous with each other but disjoint from other groups of frequency layers.

In some cases, phase coherence can be essential information for join-processing of PRS measurements across frequency layers. For instance, when consistent timing and phase across PRS resources are applicable, measurements over contiguous bandwidth segments allocated to different frequency layers and/or resources can be effectively "stitched" into a single wide bandwidth. Examples of "stitching" include combining, adding, supplementing, allocating, grouping, and/or assigning of frequencies, frequency bands, or CCs as described herein.

Different CCs utilize different transceivers, and in turn, may have different oscillators. As such, the phase of each of the CCs may be different. For example, there may be a phase difference (Δ phase) across the measurements of the different CCs. When CCs of different phase are stitched together, the CCs may not be aligned. The timing of measurements of the CCs may also be different because different clocks may be associated with each of the CCs. In these instances, phase coherence or timing coherence becomes an important factor and procedures can be conducted to align phase and/or timing coherence.

When receiving DL PRS resources, the UE may not be aware of whether the resources that belong to two frequency layers are phase coherent. As such, by default, the UE can assume that phase coherence is not applicable because, if the frequency layers are not phase coherent, the wide bandwidth may be ineffectual. Though a wide bandwidth with non-phase coherent frequency layers may still be usable, the wide bandwidth with non-phase coherent frequency layers may not be more efficient or accurate than taking measurements individually from each of the non-phase coherence frequency layers, which can lead to performance degradation. In other instances, the UE can fail to stitch frequency contiguous resources into a single larger bandwidth even when phase coherence is present if the UE is not aware that the frequency resources are phase coherent.

In some cases, the network (e.g., a base station such as a gNB, a location server or LMF, or other network entity) can transmit to a UE an explicit indication (e.g., an indication including calibration information) regarding whether there is phase coherence (e.g., Δ phase) across frequency layers and resources. With such an explicit indication, the UE can group or adjust frequency adjacent layers that are phase coherent into a larger piece of bandwidth before estimating TOA, which can improve accuracy in the TOA and/or associated position estimate. In some cases, the network can transmit the explicit indication to the UE to provide phase coherence information of the frequency layers and resources. The UE can then utilize the phase coherence information to determine which frequencies to utilize as a single larger bandwidth. The UE can also receive an indication of which frequencies to combine into a larger bandwidth from the network based on phase coherence information determined by the network.

In some instances, a UE can be configured to operate with multiple frequency layers (e.g., in lower level and higher level frequency layers). In some cases, there may be multiple TRPs for each frequency layer, with each TRP having multiple resources. The phase coherence information for a TRP can be conveyed to the UE from the network according to the following examples.

In one example, for a TRP, if the phase is consistent across resources in each frequency layer, the network can transmit information to the UE indicating to the UE whether the TRP has any layers with different phases (e.g., a layer-based approach). In this example, the UE presumes that the phase is consistent across resources of each respective frequency layer. Alternatively, the UE can presume that the resources of each respective frequency layer are not phase coherent and can await receipt of phase coherence information from the network. The information can be transmitted to the UE from the network using various methods. For example, the network (e.g., a base station such as a gNB, a location server or LMF, or other network entity) can transmit a list of indicators (e.g., Boolean indicators), a bit array (or bitmap) for frequency layers, a list of frequency layers and resources of the frequency layers that are in phase coherence, or any combination thereof.

Figures 8A, 8B:
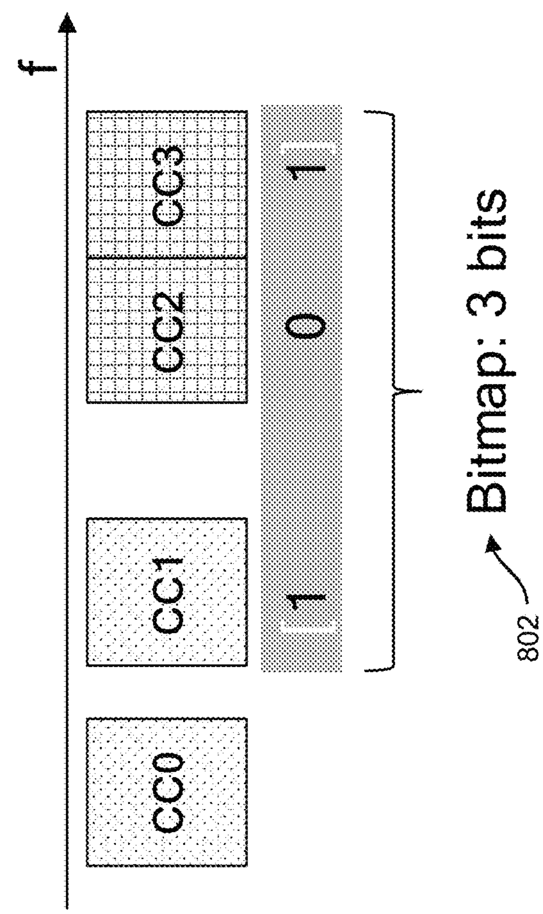
FIG. 8A illustrates example frequency bands and their associated phase coherence, in accordance with some aspects of the present disclosure.
FIG. 8B illustrates an example bitmap of component carriers of FIG. 8A, in accordance with some aspects of the present disclosure.

For example, a list of Boolean indicators can include a list of frequency layers and corresponding Boolean indicators. The Boolean indicators can indicate which frequency layers are phase coherent. The Boolean indicators can be associated with each pair of frequency layers for the TRP. In some instances, the frequency layers of each pair can be phase coherent to each other, as shown in FIG. 8A (described below). In some cases, the Boolean indicators can be associated with a bitmap. In one illustrative example, a list of Boolean indicators can include four frequency layers, with six different pairs, and a six bit-long bitmap. The bitmap can include values such as 0 and 1 that can indicate which frequency layers are phase coherent (e.g., with one value such as 0 indicating phase coherence with a previous frequency layer and the other value such as 1 indicating non-phase coherence with a previous frequency layer). Furthermore, based on the bitmap of the list of Boolean indicators, the UE can determine which frequency layers and their corresponding resources are phase coherent. The list of frequency layers and their corresponding Boolean indicators may be an exhaustive list of frequency layers indicating which frequency layers are phase coherent and/or which frequency layers are to be combined.

FIG. 8A illustrates example frequency bands and their associated phase coherence, in accordance with some examples of the present disclosure. In FIG. 8A, consecutive frequency bands that are in phase coherence are shown with the same pattern. In this example, four frequency layers are illustrated over four disjoint bandwidth segments. Two pairs of frequency bands are illustrated as CC0:CC1 and CC2:CC3. Component carriers CC0 and CC1 are phase coherent to each other, and CC2 and CC3 are phase coherent to each other. In this example, CC0 and CC1 are not phase coherent with CC2 and CC3. As shown in FIG. 8A, a bitmap 802 provides an indication of phase coherence between the various frequency bands (e.g., CC0, CC1, CC2, and CC3). For example, the bitmap 802 can include an (n−1)-bit array with n frequency layers (where n=4 for the four frequency layers illustrated in FIG. 8A. Fewer bits or more bits can be provided in some examples, such as five bits, 8 bits, ten bits, or other number of bits, which can depend on the number of frequencies or component carriers in some cases. The n-th bit can be set to 1 if the (n+1)-th layer is phase coherent with the n-th layer, and can be set to 0 if the (n+1)-th layer is not phase coherent with the n-th layer. As shown in FIG. 8A, the bitmap includes three bits, including a bit value of 1 for CC1, a bit value of 0 for CC2, and a bit value of 1 for CC3. The bit value of 1 for CC1 indicates that CC1 is phase coherent with CC0. The bit value of 0 for CC2 indicates that CC2 is not phase coherent with CC1. The bit value of 1 for CC3 indicates that CC3 is phase coherent with CC2. In some examples, the bitmap 802 can include a group value or designation for each component carrier to indicate one or more groups of component carriers that are phase coherent (e.g., CC0 and CC1 are phase coherent and can have a common group designation or value, CC02 and CC03 are phase coherent and can have a common group designation or value, etc.).

FIG. 8B is a table further illustrating the bitmap 802 of the component carriers of FIG. 8A, in accordance with some examples of the present disclosure. Similar to the bitmap 802 of FIG. 8A, the bitmap can include an (n−1)-bit array with n frequency layers (e.g., four frequency layers as illustrated in FIGS. 8A and 8B), wherein the n-th bit can be set to 1 if the (n+1)-th layer is phase coherent with the n-th layer, and can be set to 0 if the (n+1)-th layer is not phase coherent with the n-th layer. As shown in FIG. 8B, CC1 can include a bit value of 1 (CC1: 1), CC2 can include a bit value of 0 (CC2: 0), and CC3 can include a bit value of 1 (CC3: 1). While the bitmap 802 in the example of FIGS. 8A and 8B include three bits, fewer bits or more bits can be provided in some examples, which can depend on the number of frequencies or component carriers. As illustrated in FIG. 8B, the bitmap 802 may also include group values (which may be predetermined) to indicate one or more groups of component carriers that are phase coherent and that can thus be grouped together into a larger bandwidth. For example, as shown in FIG. 8B, CC0 and CC1 which are phase coherent are in a first group (with a group value of 1), and CC2 and CC3 which are phase coherent are in a second group (with a group value of 2). In some cases, CC0 may not include a bit value, but can include a group value of 1.

A network (e.g., a base station such as a gNB, a location server or LMF, or other network entity) can transmit the bitmap 802 to a UE as an explicit indication regarding whether there is phase coherence (e.g., Δ phase) across the component carriers CC0, CC1, CC2, and CC3. Using the information in the bitmap 802, the UE can group or adjust frequency adjacent layers that are phase coherent into a larger piece of bandwidth before determining its positioning (e.g., by estimating TOA). Using the information provided by the bitmap of FIG. 8A, the UE can stitch CC0 and CC1 together (based on determining the bit value of 1 for CC1 or determining the group value of 1 for CC0 and CC1, which indicates that CC1 and CC0 are phase coherent) and/or can stitch CC2 and CC3 together (based on determining the bit value of 1 for CC3 or determining the group value of 2 for CC2 and CC3, which indicates that CC3 and CC2 are phase coherent) to form a larger bandwidth.

In some cases, an indication of phase coherence can be signaled when phase changes across resources for one or more TRPs. For instance, if the phase also changes across resources for a TRP, the network (e.g., a base station such as a gNB, a location server or LMF, or other network entity) can signal information to the UE indicating that the TRP has different phases across different resources and layers. In some examples, the information can be transmitted to the UE in one or more lists. For example, each list can include information summarizing a group of frequency layers and resources that are phase coherent. The list does not have to be exhaustive, but can include specific frequency layers and resources. Illustrative examples are provided with respect to FIG. 9 and FIG. 10.

Figure 9:
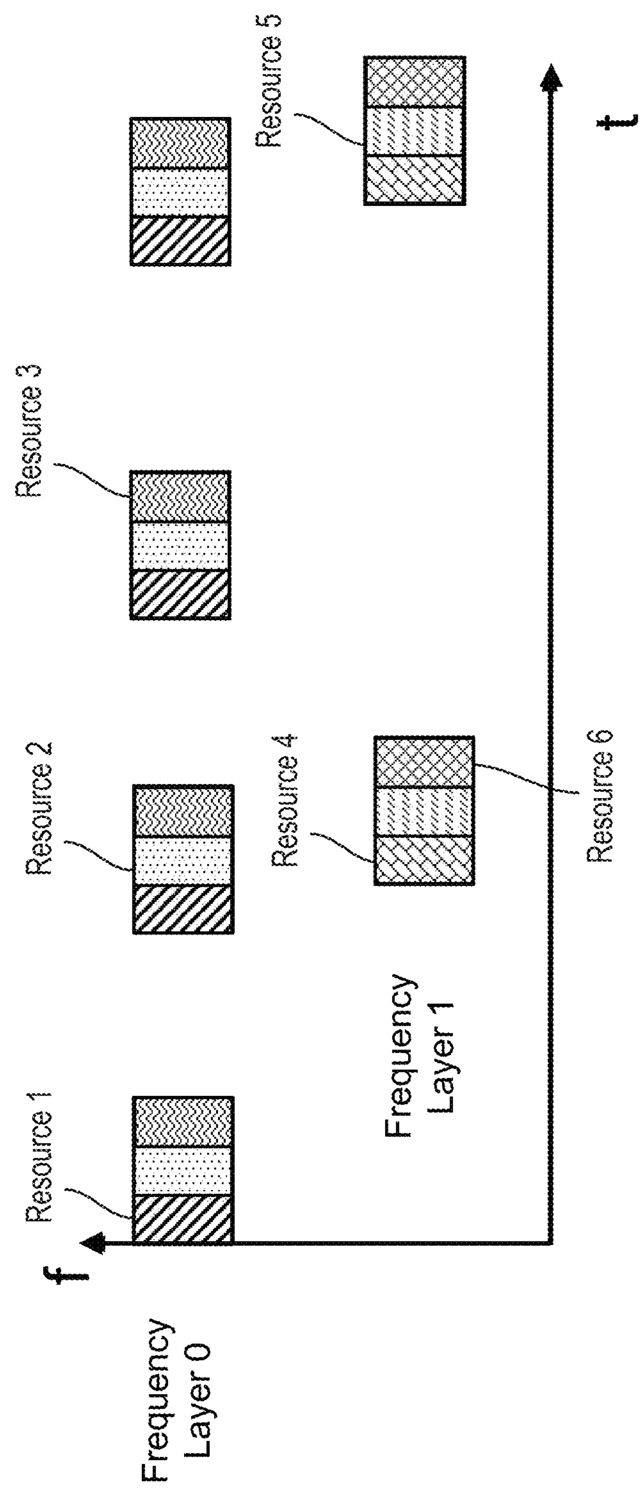
FIG. 9 illustrates example frequency layers and resources, in accordance with some aspects of the present disclosure.

FIG. 9 illustrates example frequency layers and resources (e.g., resources 1-6), in accordance with some aspects of the present disclosure. For example, FIG. 9 illustrates two frequency layers (including frequency layer 0 and frequency layer 1) and three corresponding resources for each frequency layer (including resource 1, resource 2, and resource 3 for frequency layer 0 and resource 4, resource 5, and resource 6 for frequency layer 1). In this instance, two frequency layers with three resources each provide six different combinations of phase coherence relations. As noted above, if the phase also changes across resources for a TRP, the network (e.g., a base station such as a gNB, a location server or LMF, or other network entity) can signal information to the UE indicating that the TRP has different phases across different resources and layers. For example, referring to FIG. 9, if resource n of frequency layer 0 (e.g., resource 1, 2, or 3) and resource m of frequency layer 1 (e.g., resource 4, 5, or 6) are not on any common list, the UE considers resource n of frequency layer 1 and resource m of frequency layer 2 to not be phase coherent.

Figure 10:
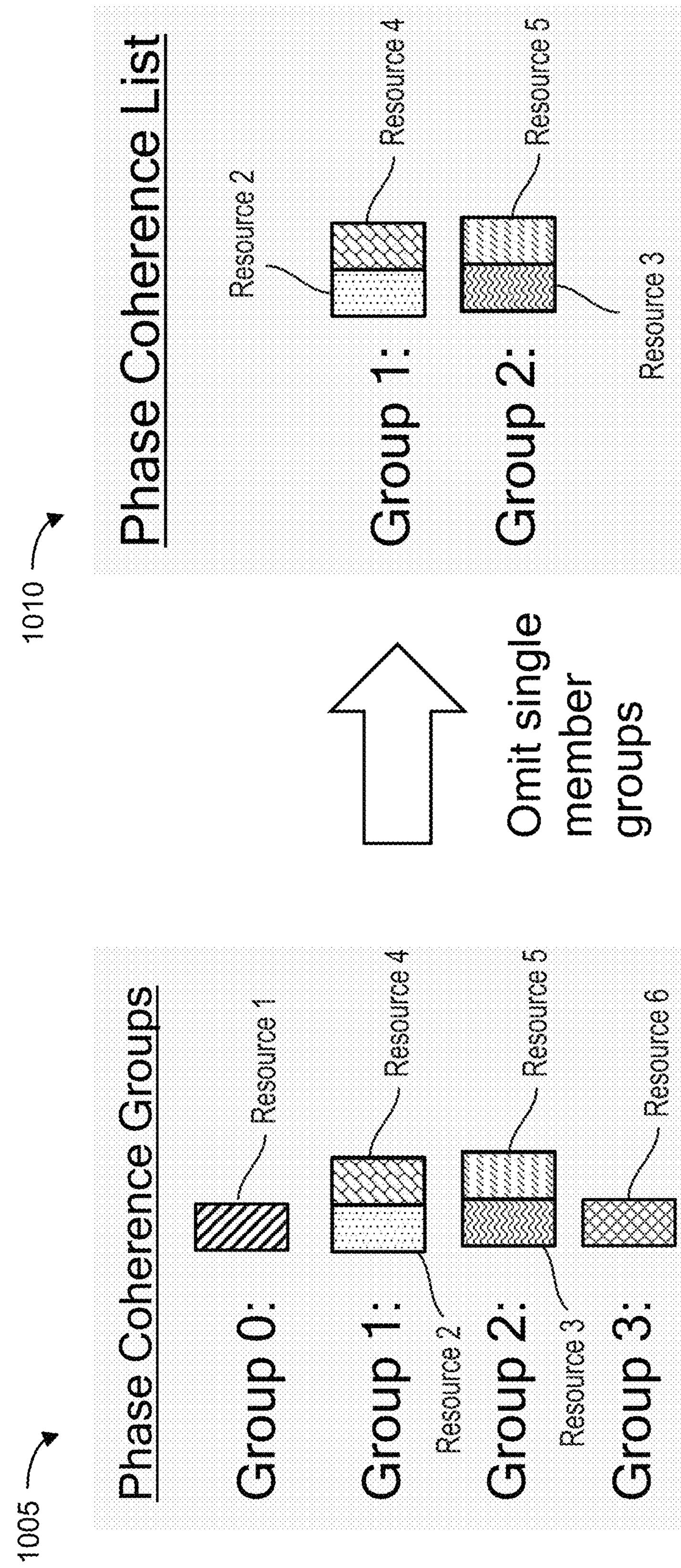
FIG. 10 illustrates example phase coherence groups, in accordance with some aspects of the present disclosure.

FIG. 10 illustrates example phase coherence groups 1005 with respect to the frequency layers and resources shown in FIG. 9. For example, FIG. 10 illustrates groups of resources along with their corresponding phase. For example, Group 0 includes resource 1, Group 1 includes resources 2 and 4, Group 2 includes resources 3 and 5, and Group 3 includes resource 6. FIG. 10 further illustrates a phase coherence list 1010 including group 1 and group 2 from the phase coherence groups 1005, along with phase coherent resources, where single member groups are omitted from the phase coherence list. In the example shown in FIG. 10, Group 1 (including resource 2 from frequency layer 0 and resource 4 from frequency layer 1) and Group 2 (including resource 3 from frequency layer 0 and resource 5 from frequency layer 1) are listed as groups that are phase coherent. Once a phase coherence list (e.g., phase coherence list 1010) is generated by the network, the network can transmit the phase coherence list to the UE. Based on the information in the phase coherence list, the UE can determine the list of groups of resources that are phase coherent. Using the disjoint phase coherent resources identified in the phase coherence list, the UE can triangulate its position and/or exchange positioning data with the network.

In some examples, UEs can implement different algorithms for processing aggregated bandwidth through disjoint bands, such as by performing PRS stitching. To obtain better performance or algorithm needs (e.g., on the downlink—PRS or uplink—SRS), the UE may have a specific bandwidth implementation preference and provide the bandwidth implementation preference to the network to determine which frequency bands to allocate to the UE. In some examples, the UE can include an information element (IE) or control element (CE) in a signaling message to indicate its configuration preference for PRS stitching. The UE can transmit the signaling message with the information or control element to the network (e.g., to a base station, location server, or other network entity). For the uplink from UE to the network (e.g., in one or more SRS resources), the transmission can be initiated by the UE, instead of the network. In some cases, the UE can provide timing differences to the TRP when used to transmit data. A set of example parameters including various signaling methods is described below, where the parameters can be explicitly signaled or implicitly derived by the UE (in which case an information element (IE) is not explicitly signaled).

Explicit signaling is when the UE transmits information including an explicit implementation preference to the network (e.g., a base station such as a gNB, a location server or LMF, and/or other network entity), such as by signaling one or more IEs indicating the implementation preference. The explicit signaling (e.g., one or more IEs) can be provided in a master information block (MIB), system information block (SIB), radio resource control (RRC) message, MAC-control element (MAC-CE), downlink control information (DCI), and/or other signaling message or resource. Implicit derivation is where the network (e.g., a base station, a location server or LMF, or other network entity) implies that the UE has a particular preference based on information that is signaled by the UE or based on information that is not signaled. Implicit derivation can also be defined as a default signaling implementation utilized by the network and the UE (which is not based on any signaling).

In some aspects, preference for a band combination of a UE can be explicitly signaled or can be implicitly derived by the network (e.g., a base station, a location server or LMF, or other network entity). Examples of preference information that a UE can explicitly signal can include an indication of whether the UE supports inter-band or intra-band only, an indication of whether the UE supports non-contiguous bands or contiguous bands only, an indication of whether the UE supports only same frequency (FRx) or supports cross frequency (FRx+FRy, such as FR1+FR2). Furthermore, the UE can explicitly signal, in an IE, a list including specific bands (e.g., carrier bands), CCs, and/or frequencies preferred by the UE for positioning triangulation purposes. In the instance where applying a time domain-based ranging algorithm does not benefit from distantly separated disjoint bands, the UE may provide a preference for contiguous bands only. In the instances where the UE employs an advanced algorithm that can utilize disjoint bands with gaps, the UE may request or provide a preference for non-contiguous inter-band or intra-band support. As such, the UE may select a band combination as its preferred bandwidth implementation. As described herein, it may be difficult to obtain a large contiguous block of bandwidth. The techniques described herein that allow the use of disjoint bands alleviates the difficulty in obtaining a contiguous block of bandwidth. By selecting a band combination using disjoint bandwidths, a larger bandwidth is provided. The larger bandwidth may provide more accurate positioning measurements, may reduce multipath or false peak detection, among other benefits.

In some examples, the preference for a band combination of a UE can be implicitly derived (e.g., where an IE is not included) by the network (e.g., a base station, a location server or LMF, or other network entity). For instance, if the network determines a UE has not provided an IE indicating particular preference information, the network can imply the preference of the UE. In one illustrative example, if no IE information is signaled by the UE, the network may imply that the UE only supports only intra-band, only supports FRx, and only supports contiguous bands.

In other aspects, a preference for numerology and comb-symbol patterns of a UE can be explicitly signaled by the UE (e.g., in one or more IEs) or can be implicitly derived by the network (e.g., a base station, a location server or LMF, or other network entity). Examples of preference information that a UE can explicitly signal can include an indication of the same numerology, an indication of the same comb-symbol patterns across frequency layers, an indication of the same PRS frequency spacing after destaggering, and/or other information. The indications can be across frequency layers or different numerology and comb-symbol patterns across component carriers of a frequency layer.

By applying a time domain-based ranging algorithm, the UE may not benefit from non-uniform frequency sampling (e.g., due to stitching of two adjacent bands with different numerologies) because the shape of the corresponding time domain waveform may introduce ambiguity in estimating the signal arrival time. Frequency domain-based advanced algorithms may utilize frequency samples to estimate the signal arrival time.

Depending on the algorithm utilized by the UE, the UE may indicate to the network (e.g., by signaling one or more IEs to a base station, a location server or LMF, or other network entity) a preferred numerology and/or comb-symbol pattern for different component carriers for PRS transmissions. Furthermore, selection of the preference by the UE may include timing drift between the component carriers to confirm that the component carriers are in synchronization. The algorithm utilized by the UE may also include a tolerance for delay that can leverage measurements across different component carriers to calculate a time drift and adjust accordingly. As such, the UE may select a numerology and/or comb-symbol patterns as its preferred bandwidth implementation.

Table 2 below provides an example of numerology and comb-symbol patterns that can be preferred and/or used by the UE and that can also be provided to the network (e.g., by transmitting one or more IEs to a base station, a location server or LMF, or other network entity). In this instance, numerology choices range from 0-4 and comb-symbol patterns include a value in the range of 12-14.

TABLE 2

| Numerology (μ) | Comb-Symbol Pattern |
|---|---|
| 0 | 14 |
| 1 | 13 |
| 2 | 12 |
| 3 | 14 |
| 4 | 13 |

Other numerology and comb-symbol patterns are envisioned in this disclosure. Different combinations of numerology and comb-symbol patterns may also be preferred and/or used by the UE over different component carrier frequencies, which can then be provided to the network. PRS spacing may also be a factor that is selected by the UE. The PRS signal may be separated from the frequency domain across multiple symbols.

In some instances, if two signals (e.g., a first signal and a second signal) are utilizing the same comb-symbol, the transmission in the frequency domain can be shifted between the two signals to avoid overlap in the frequency domain of the two signals, which is referred to as staggering. "Destaggering" refers to, from symbol to symbol, the frequency allocation of the PRS tones being disjoint or not overlapping. In one example, for different PRS, there may be frequency separation such as 240 kHz (e.g., PRS location spacing in the frequency domain). After the staggering process is performed across multiple tones, there may be approximately 30 kHz spacing between the PRS tones. In some instances, the same comb can be utilized across different component carriers, and after the staggering process, the UE can determine whether the PRS frequency spacing is adequate. In which case, the UE may prefer the same PRS frequency after the staggering and/or destaggering process. This process may be utilized in a 5G or LTE dynamic spectrum setting (including asset tracking in an industrial IoT setting that can track the macro narrowband LTE IoT signal, which may leave the industrial IoT setting to a pure narrowband IoT configuration).

Figure 12:
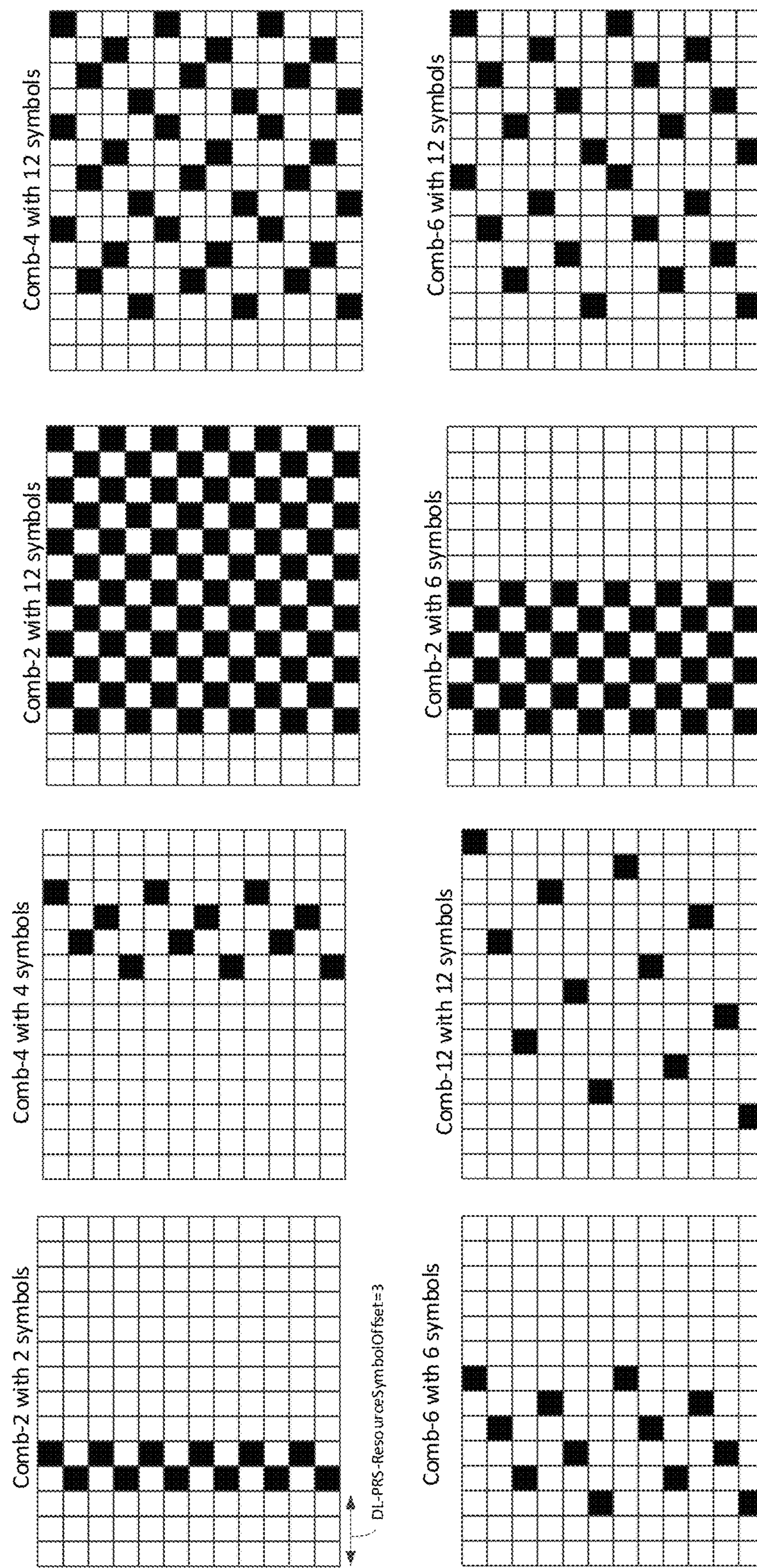
FIG. 12 illustrates an example chart of comb-symbol patterns, in accordance with some aspects of the present disclosure.

FIG. 11 illustrates an example table of comb-symbol patterns, in accordance with some examples of the present disclosure. FIG. 12 illustrates example chart of comb-symbol patterns, in accordance with some examples of the present disclosure. For example, patterns of DL PRS resources within a slot are illustrated in FIGS. 11 and 12. A DL PRS resource can span within slots 2, 4, 6, 12 consecutive symbols with a fully frequency-domain staggered pattern. The DL PRS resource can also be configured in any high layer configured DL or FL symbol of a slot. Moreover, constant energy per resource element (EPRE) can be for REs of a given DL PRS resource.

In some cases, the numerology, comb-symbol patterns, and/or PRS frequency spacing can be derived based on a default setting if no preferences are signaled by the UE. In one illustrative example, if no preference is signaled by the UE in one or more IEs, the network (e.g., a base station, a location server or LMF, or other network entity) can infer that the UE prefers only the same numerology, the same comb and symbol across frequency layers, and the same PRS frequency spacing after destaggering.

In yet another aspect, the UE can employ an advanced algorithm to estimate and compensate for timing drift and timing error between different PRS layers and/or resources. Understanding the UE's tolerance on the timing drift can provide better resource allocation for UE performance and network efficiency. As such, the UE may select a time drift as its preferred bandwidth implementation and provide a range to the network accordingly.

Moreover, the UE can explicitly signal (e.g., in one or more IEs) a time period error or difference (e.g., a Δ time period) between PRS resources from different frequency layers as a preference to the network (e.g., a base station, a location server or LMF, or other network entity). If the timing between two PRS resources is too small or too large, then an aggregated bandwidth of the two PRS resources may not provide the improvement of a wide bandwidth as discussed herein. As such, the UE can signal timing related information such as PRS resource timing accuracy to the network to utilize resources with low timing error. In some cases, the network can implicitly derive the time period difference and/or other information.

In some examples, the UE can explicitly signal one or more IEs indicating PRS resource timing accuracy preferences, such as timing error between a PRS resource from different frequency layers. The timing error may include information for PRS resources with a time difference of less than x seconds and within y seconds window. In other instances, the UE may indicate a preference for a near perfect synchronization between the PRS resources or assistance data for timing from the network.

In some examples, the network (e.g., a base station, a location server or LMF, or other network entity) can implicitly derive (e.g., when one or more IEs are not signaled by a UE) the PRS resource timing accuracy preferences. In one illustrative example, the network can infer that the UE prefers a near perfect synchronization. In another illustrative example, the network can infer that the UE prefers that the network provides to the UE assistance data for timing purposes.

In addition to the listed preferences described herein, the UE can also indicate its capability. For example, UE capability can include information regarding its ability to utilize information that the transmission is phase coherent across the PRS resources. In one example, in an intra-band scenario, the UE can stitch contiguous bands into a single larger bandwidth when phase coherence is maintained across the PRS resources. In some other instances (e.g., FR1+FR2), the algorithm can process the PRS resources of FR1 & FR2 jointly, but this may not fully exploit the coherence information. By knowing the UE capability of exploiting the Tx coherence, the gNB may be able to avoid unnecessary processing by not attempting to maintain coherence for the UEs that can't make use of it to begin with. Furthermore, in the instance where the UE cannot provide its capability at the beginning of the process described herein, the UE can provide, in the measurements, an indication of whether the UE is capable of providing a preference to the network.

In some aspects, preferences relating to an ability of a UE to use phase coherence information can be explicitly signaled or can be implicitly derived by the network (e.g., a base station, a location server or LMF, or other network entity). Examples of preference information relating to phase coherence that a UE can explicitly signal can include an indication of the UE's capability to use phase coherence information across PRS resources. In some instances, phase coherence information can be used in stitching as described herein.

In some aspects, the network (e.g., a base station, a location server or LMF, or other network entity) can implicitly derive preferences relating to an ability of a UE to use phase coherence information (e.g., where an IE is not included) based on default preferences of the UE. In one illustrative example, if no information is signaled by a UE regarding its ability to use phase coherence information, the network can imply that phase coherence information is not used by the UE when performing stitching.

In some examples, the methods and systems described herein can be utilized on the uplink (e.g., SRS) where the transmission can be initiated by the UE, instead of the network. In some cases, the examples described herein can be utilized with a sounding reference signal (SRS) for positioning or downlink PRS, which may be used in a similar manner as that described above with respect to a TRP.

Figure 13:
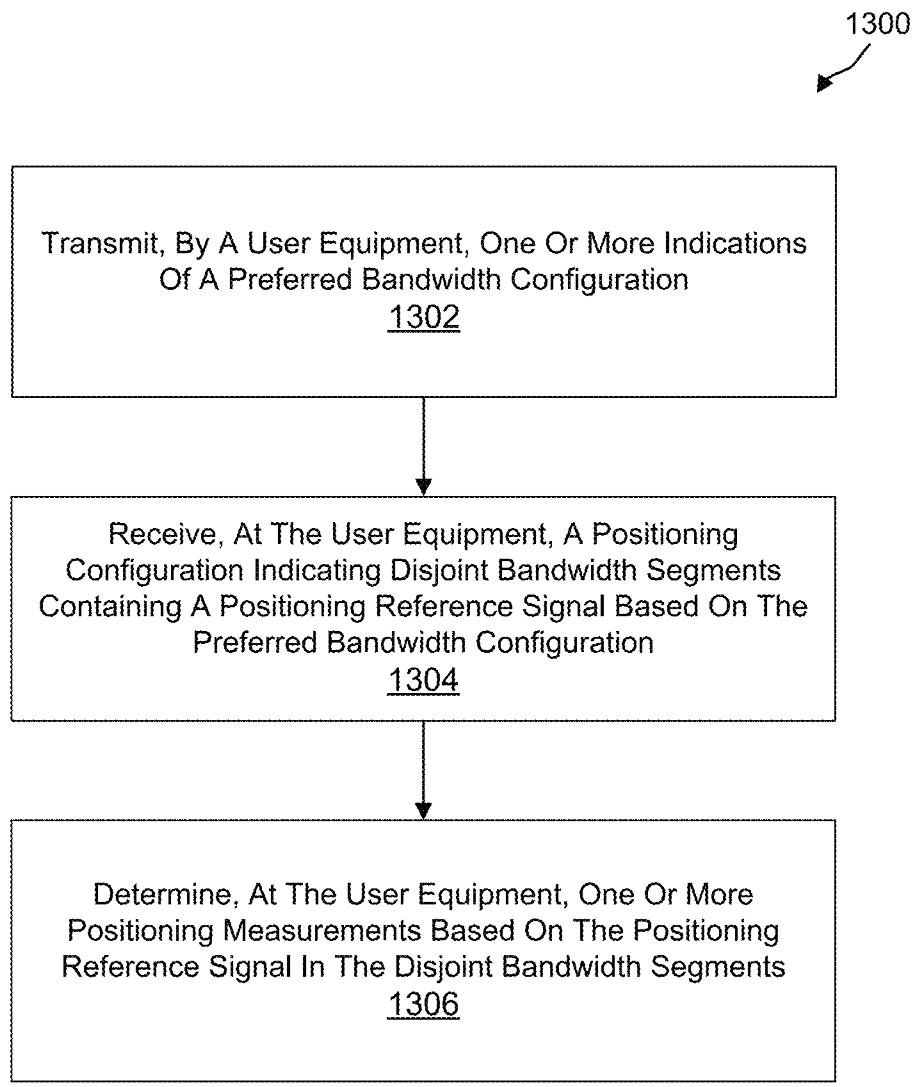
FIG. 13 illustrates a flow diagram of an example process for performing wireless positioning with disjoint bandwidth segments by a user equipment, in accordance with some aspects of the present disclosure.

FIG. 13 illustrates an example flow diagram of a process 1300 for performing signaling consideration operations for wireless positioning with disjoint bandwidth segments by a user equipment, in accordance with some examples of the present disclosure. At operation 1302, the process 1300 can include transmitting, by a user equipment, one or more indications of a preferred bandwidth configuration. In some examples, the preferred bandwidth configuration is a bandwidth combination preference as shown in FIGS. 8A and 8B. In some implementations, the bandwidth combination preference includes a list of preferred carrier bands as shown in FIGS. 8A and 8B. In some cases, the preferred bandwidth configuration is a numerology preference as shown in FIGS. 11 and 12. In some examples, the numerology preference includes comb and symbol information across frequency layers as shown in FIGS. 11 and 12.

In some implementations, the preferred bandwidth configuration is a timing error tolerance preference. For example, the UE can explicitly signal one or more IEs indicating PRS resource timing accuracy preferences, such as timing error between a PRS resource from different frequency layers. The timing error may include information for PRS resources with a time difference of less than x seconds and within y seconds window. In other instances, the UE may indicate a preference for a near perfect synchronization between the PRS resources or assistance data for timing from the network.

At operation 1304, the process 1300 can include receiving, at the user equipment, a positioning configuration indicating disjoint bandwidth segments containing a positioning reference signal based on the preferred bandwidth configuration. For example, signaling considerations for positioning can include which signals, resources, frequency layers, frequencies, frequency bands, bandwidths, and/or component carriers to utilize for positioning purposes (e.g., positioning reference signal resources).

In some examples, the disjoint bandwidth segments include a plurality of frequency layers as shown in FIG. 7. In some implementations, each frequency layer of the plurality of frequency layers are noncontiguous from each other frequency layer as shown in FIG. 9. In some cases, the plurality of frequency layers form a plurality of groups of frequency layers, a frequency layer of the plurality of frequency layers being noncontiguous with a group of the plurality of groups of frequency layers as shown in FIG. 10.

At operation 1306, the process 1300 can include determining, at the user equipment, one or more positioning measurements based on the positioning reference signal in the disjoint bandwidth segments. For example, the UE can receive an assignment of disjoint bandwidth segments for wireless positioning based on the preferred bandwidth implementation, and can utilize the assignment of the disjoint bandwidth segments on a downlink to receive positioning data from the base station.

In some examples, the process 1300 includes receiving, at the user equipment, a request for the preferred bandwidth configuration from a base station.

Figure 14:
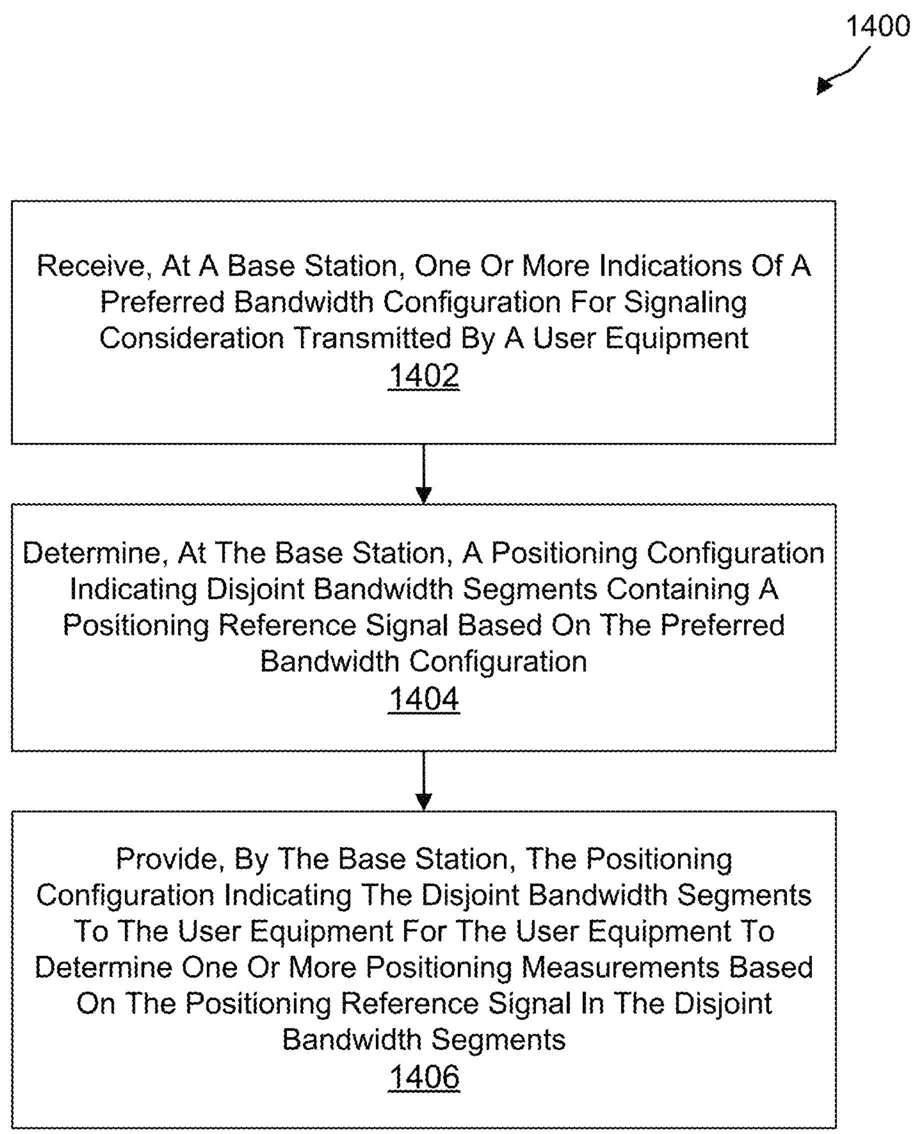
FIG. 14 illustrates an example flow diagram of a process for performing wireless positioning with disjoint bandwidth segments by a base station, in accordance with some aspects of the present disclosure.

FIG. 14 illustrates an example flow diagram of a process for performing wireless positioning with disjoint bandwidth segments by a base station, in accordance with some examples of the present disclosure. At operation 1402, the process 1400 can include receiving, at a base station, one or more indications of a preferred bandwidth configuration for signaling consideration transmitted by a user equipment. In some examples, the preferred bandwidth configuration is a bandwidth combination preference as shown in FIGS. 8A and 8B. In some implementations, the bandwidth combination preference includes a list of preferred carrier bands as shown in FIGS. 8A and 8B. In some cases, the preferred bandwidth configuration is a numerology preference as shown in FIGS. 11 and 12. In some examples, the numerology preference includes comb and symbol information across frequency layers as shown in FIGS. 11 and 12.

In some implementations, the preferred bandwidth configuration is a timing error tolerance preference. For example, the UE can explicitly signal one or more IEs indicating PRS resource timing accuracy preferences, such as timing error between a PRS resource from different frequency layers. The timing error may include information for PRS resources with a time difference of less than x seconds and within y seconds window. In other instances, the UE may indicate a preference for a near perfect synchronization between the PRS resources or assistance data for timing from the network.

At operation 1404, the process 1400 can include determining, at the base station, a positioning configuration indicating disjoint bandwidth segments containing a positioning reference signal based on the preferred bandwidth configuration. For example, signaling considerations for positioning can include which signals, resources, frequency layers, frequencies, frequency bands, bandwidths, and/or component carriers to utilize for positioning purposes (e.g., positioning reference signal resources).

In some examples, the disjoint bandwidth segments include a plurality of frequency layers as shown in FIG. 7. In some implementations, each frequency layer of the plurality of frequency layers are noncontiguous from each other frequency layer. In some cases, the plurality of frequency layers form a plurality of groups of frequency layers, a frequency layer of the plurality of frequency layers being noncontiguous with a group of the plurality of groups of frequency layers.

At operation 1406, the process 1400 can include providing, by the base station, the positioning configuration indicating the disjoint bandwidth segments to the user equipment for the user equipment to determine one or more positioning measurements based on the positioning reference signal in the disjoint bandwidth segments. For example, the UE can receive an assignment of disjoint bandwidth segments for wireless positioning based on the preferred bandwidth implementation, and can utilize the assignment of the disjoint bandwidth segments on a downlink to receive positioning data from the base station and determine the one or more positioning measurements.

In some examples, the process 1400 includes providing, by the base station, a request for the preferred bandwidth configuration to the user equipment.

Figure 15:
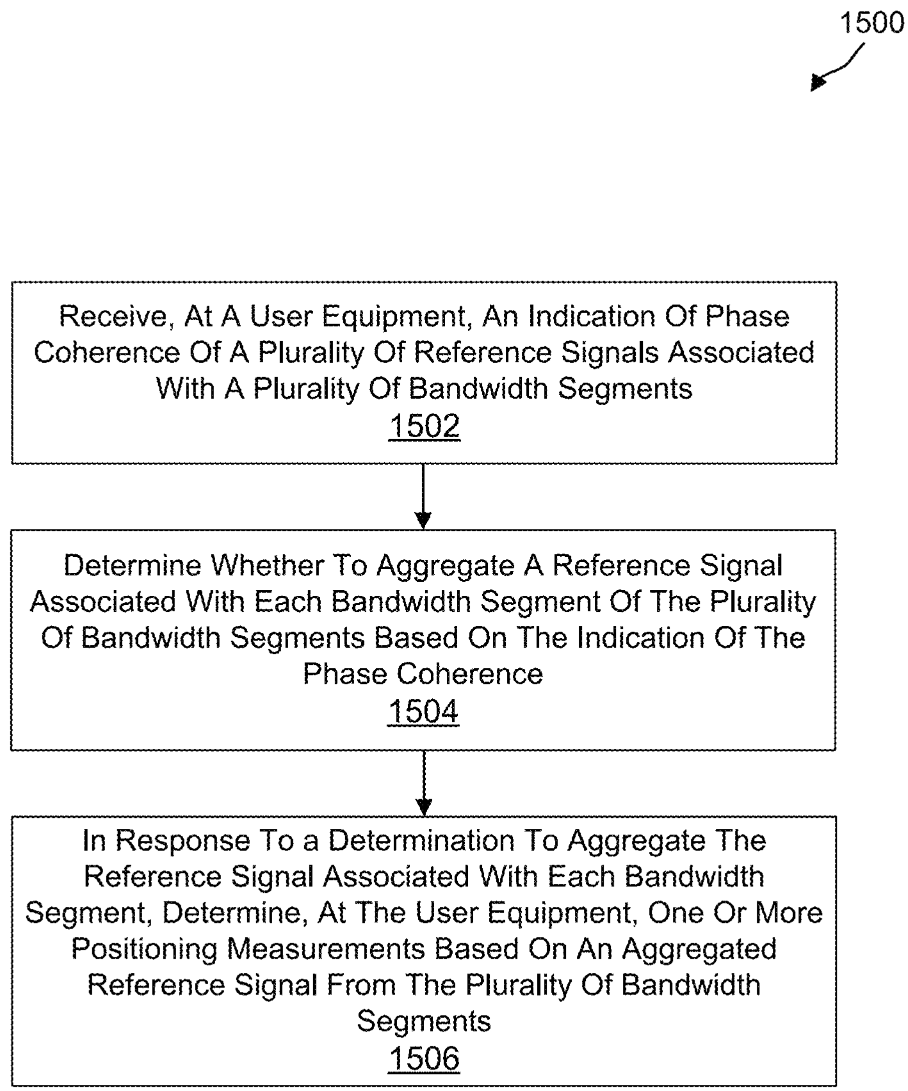
FIG. 15 illustrates an example flow diagram of a process for performing wireless positioning with phase coherence and disjoint bandwidth segments by a user equipment, in accordance with some aspects of the present disclosure.

FIG. 15 illustrates an example flow diagram of a process for performing wireless positioning with phase coherence and disjoint bandwidth segments by a user equipment, in accordance with some examples of the present disclosure. At operation 1502, the process 1500 can include receiving, at a user equipment, an indication of phase coherence of a plurality of reference signals associated with a plurality of bandwidth segments as shown in FIG. 10. Examples of reference signals can include positioning reference signals (PRSs), sounding reference signals (SRS) used for positioning, among others. The plurality of reference signals for which the indication of phase coherence is provided may include a same type of reference signal (e.g., PRS, SRS, etc.).

In some examples, the indication of the phase coherence includes a list of Boolean indicators of pairs of frequency layers. In some implementations, the list of Boolean indicators includes one or more bitmaps associated with the pairs of the frequency layers. For example, a list of Boolean indicators can include a list of frequency layers and corresponding Boolean indicators. The Boolean indicators can indicate which frequency layers are phase coherent. The Boolean indicators can also be associated with each pair of frequency layers for the TRP. In some instances, the frequency layers of each pair can be phase coherent to each other, as shown in FIG. 8A. In some cases, the Boolean indicators can be associated with a bitmap. In one illustrative example, a list of Boolean indicators can include 4 frequency layers, with 6 different pairs, and a 6 bit-long bitmap.

In some cases, the indication of the phase coherence includes a bit array of a plurality of frequency layers. In some examples, the plurality of frequency layers are sorted from low frequency to high frequency. In some implementations, the indication of the phase coherence includes a list of frequency layers and resources in phase coherence. In some instances, the UE can determine which frequency layers and their corresponding resources are phase coherent. The list of frequency layers and their corresponding Boolean indicators may be an exhaustive list of frequency layers.

At operation 1504, the process 1500 can include determining whether to aggregate a reference signal associated with each bandwidth segment of the plurality of bandwidth segments based on the indication of the phase coherence as shown in FIGS. 9 and 10.

In some examples, the plurality of bandwidth segments include a plurality of frequency layers as shown in FIG. 10. In some implementations, each frequency layer of the plurality of frequency layers are noncontiguous from each other frequency layer. In some cases, the plurality of frequency layers form a plurality of groups of frequency layers, a frequency layer of the plurality of frequency layers being noncontiguous with a group of the plurality of groups of frequency layers. In some examples, the plurality of frequency layers includes consecutive and noncontiguous frequency layers.

At operation 1506, in response to a determination to aggregate the reference signal associated with each bandwidth segment, the process 1500 can include determining, at the user equipment, one or more positioning measurements based on an aggregated reference signal from the plurality of bandwidth segments. For example, the UE can receive an assignment of disjoint bandwidth segments for wireless positioning based on the preferred bandwidth implementation, and can utilize the assignment of the disjoint bandwidth segments on a downlink to receive positioning data from the base station. The user equipment can determine the one or more positioning measurements using the aggregated reference signal from the disjoint bandwidth segments.

Figure 16:
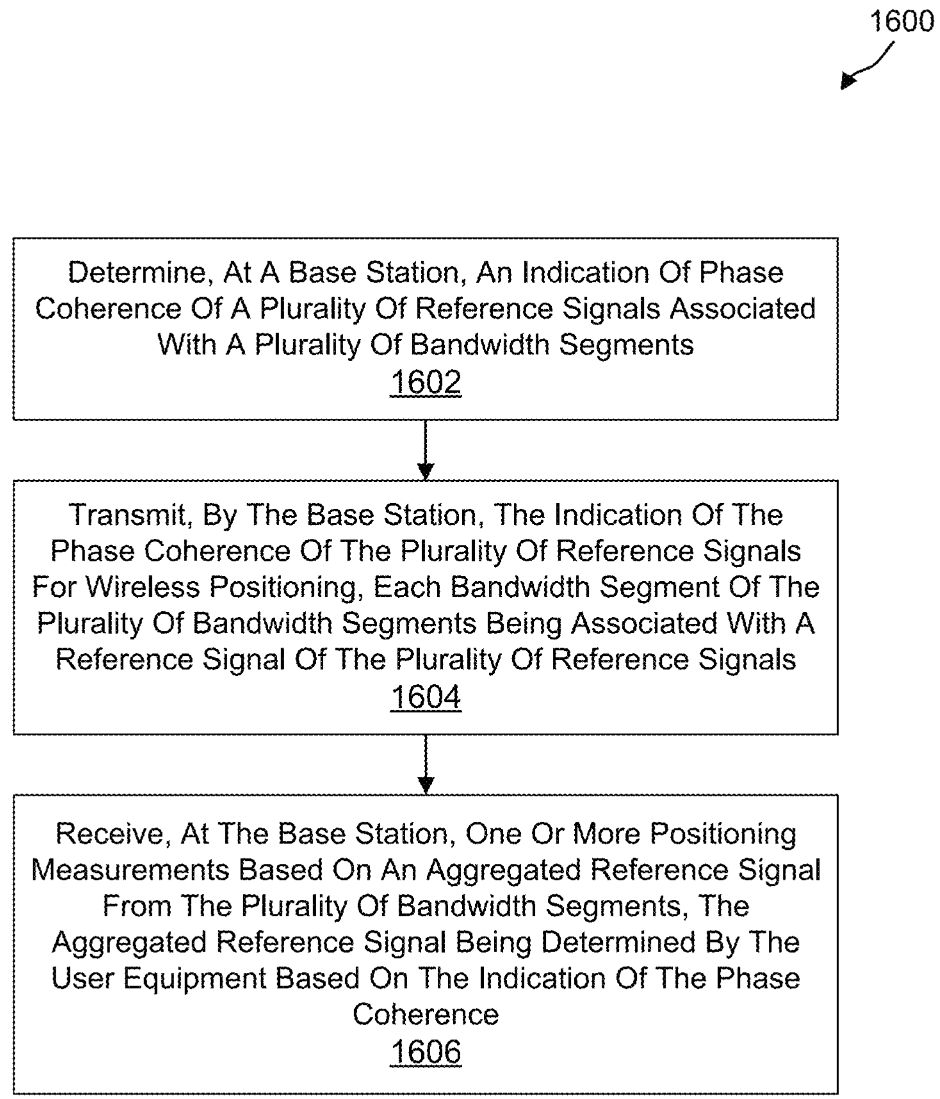
FIG. 16 illustrates an example flow diagram of a process for performing wireless positioning with phase coherence and disjoint bandwidth segments by a base station, in accordance with some aspects of the present disclosure.

FIG. 16 illustrates an example flow diagram of a process for performing wireless positioning with phase coherence and disjoint bandwidth segments by a base station, in accordance with some examples of the present disclosure. At operation 1602, the process 1600 can include determining, at a base station, an indication of phase coherence of a plurality of reference signals associated with a plurality of bandwidth segments as shown in FIGS. 9 and 10.

In some examples, the indication of the phase coherence includes a list of Boolean indicators of pairs of frequency layers. In some implementations, the list of Boolean indicators includes one or more bitmaps associated with the pairs of the frequency layers. For example, a list of Boolean indicators can include a list of frequency layers and corresponding Boolean indicators. The Boolean indicators can indicate which frequency layers are phase coherent. The Boolean indicators can also be associated with each pair of frequency layers for the TRP. In some instances, the frequency layers of each pair can be phase coherent to each other, as shown in FIG. 8A. In some cases, the Boolean indicators can be associated with a bitmap. In one illustrative example, a list of Boolean indicators can include 4 frequency layers, with 6 different pairs, and a 6 bit-long bitmap.

In some cases, the indication of the phase coherence includes a bit array of a plurality of frequency layers. In some examples, the plurality of frequency layers are sorted from low frequency to high frequency. In some implementations, the indication of the phase coherence includes a list of frequency layers and resources in phase coherence. In some instances, the UE can determine which frequency layers and their corresponding resources are phase coherent. The list of frequency layers and their corresponding Boolean indicators may be an exhaustive list of frequency layers.

At operation 1604, the process 1600 can include transmitting, by the base station, the indication of the phase coherence of the plurality of reference signals for wireless positioning, each bandwidth segment of the plurality of bandwidth segments being associated with a reference signal of the plurality of reference signals as shown in FIGS. 9 and 10.

In some examples, the plurality of bandwidth segments include a plurality of frequency layers as shown in FIG. 10. In some implementations, each frequency layer of the plurality of frequency layers are noncontiguous from each other frequency layer. In some cases, the plurality of frequency layers form a plurality of groups of frequency layers, a frequency layer of the plurality of frequency layers being noncontiguous with a group of the plurality of groups of frequency layers. In some examples, the plurality of frequency layers includes consecutive and noncontiguous frequency layers.

At operation 1606, the process 1600 can include receiving, at the base station, one or more positioning measurements based on an aggregated reference signal from the plurality of bandwidth segments. The aggregated reference signal may be determined by a user equipment based on the indication of the phase coherence. For example, the UE can receive an assignment of disjoint bandwidth segments for wireless positioning based on the preferred bandwidth implementation, and can utilize the assignment of the disjoint bandwidth segments on a downlink to receive positioning data from the base station.

In some examples, the processes described herein (e.g., processes 1300, 1400, 1500, 1600 and/or other process described herein) may be performed by a computing device or apparatus. In one example, the processes 1300, 1400, 1500, 1600 can be performed by a computing device or the computing system 1700 shown in FIG. 17.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 1300, 1400, 1500, 1600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

The processes 1300, 1400, 1500, 1600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1300, 1400, 1500, 1600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
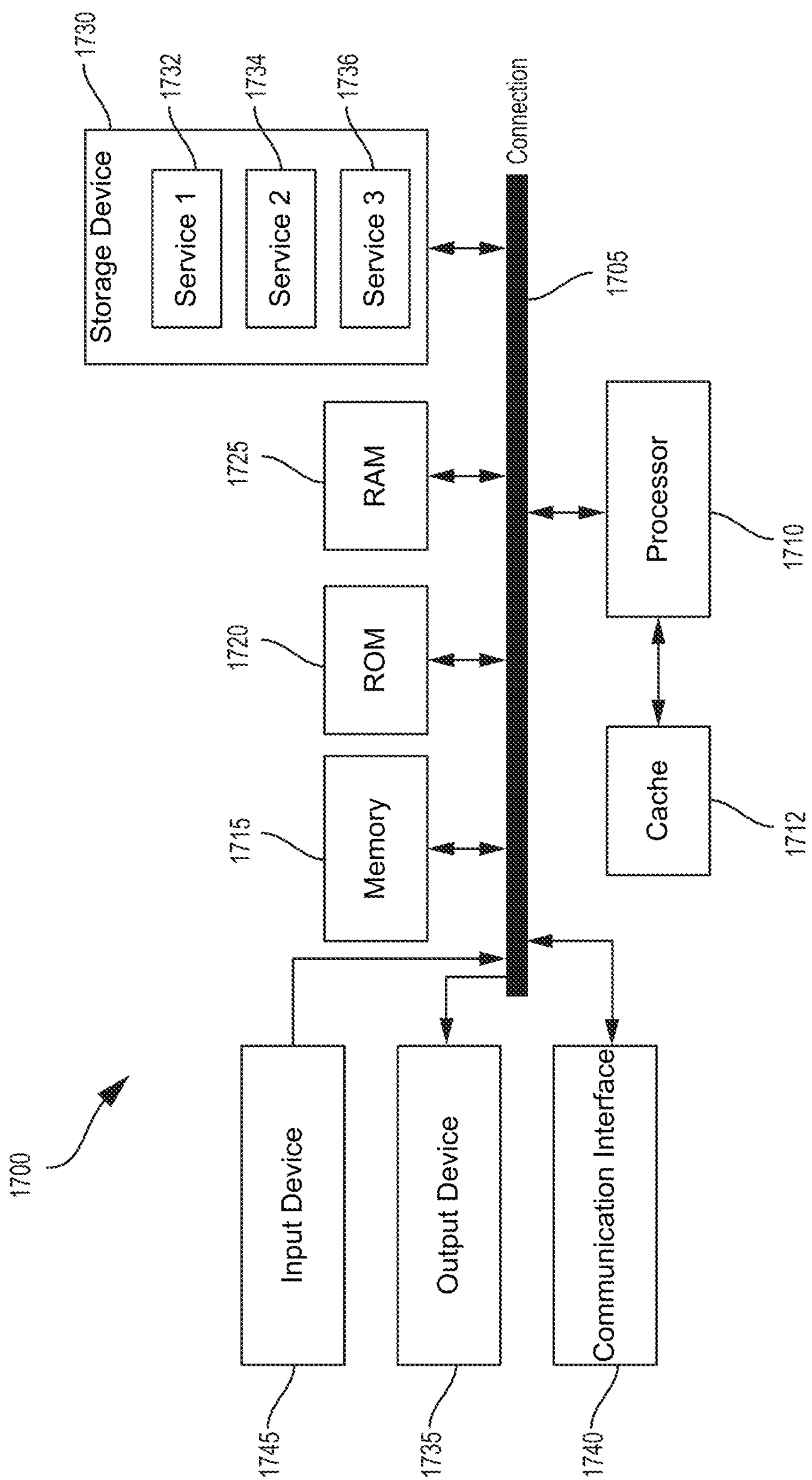
FIG. 17 illustrates an example computing system, according to aspects of the disclosure.

FIG. 17 is a diagram illustrating an example of a system for implementing certain aspects of the present technology. In particular, FIG. 17 illustrates an example of computing system 1700, which can be for example any computing device making up internal computing system, a remote computing system, a camera, or any component thereof in which the components of the system are in communication with each other using connection 1705. Connection 1705 can be a physical connection using a bus, or a direct connection into processor 1710, such as in a chipset architecture. Connection 1705 can also be a virtual connection, networked connection, or logical connection.

In some embodiments, computing system 1700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1700 includes at least one processing unit (CPU or processor) 1710 and connection 1705 that couples various system components including system memory 1715, such as read-only memory (ROM) 1720 and random access memory (RAM) 1725 to processor 1710. Computing system 1700 can include a cache 1712 of high-speed memory connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms. In some instances, multimodal systems can enable a user to provide multiple types of input/output to communicate with computing system 1700. Computing system 1700 can include communications interface 1740, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1740 may also include one or more Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1730 can include software services, servers, services, etc., that when the code that defines such software is executed by the processor 1710, it causes the system to perform a function. In some embodiments, a hardware service that performs a particular function can include the software component stored in a computer-readable medium in connection with the necessary hardware components, such as processor 1710, connection 1705, output device 1735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASIC s), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the present disclosure include:

Aspect 1. An apparatus comprising: at least one memory; a transceiver; and at least one processor coupled to the at least one memory, the at least one processor being configured to: transmit, via the transceiver, one or more indications of a preferred bandwidth configuration; receive, via the transceiver, a positioning configuration indicating disjoint bandwidth segments containing a positioning reference signal based on the preferred bandwidth configuration; and determine one or more positioning measurements based on the positioning reference signal in the disjoint bandwidth segments.

Aspect 2. The apparatus of aspect 1, wherein the preferred bandwidth configuration is a bandwidth combination preference that includes a list of preferred carrier bands.

Aspect 3. The apparatus of any one of aspects 1 or 2, wherein the preferred bandwidth configuration is a numerology preference that includes comb and symbol information across frequency layers.

Aspect 4. The apparatus of any one of aspects 1 to 3, wherein the preferred bandwidth configuration is a timing error tolerance preference.

Aspect 5. The apparatus of any one of aspects 1 to 4, wherein the disjoint bandwidth segments include a plurality of frequency layers.

Aspect 6. The apparatus of aspect 5, wherein each frequency layer of the plurality of frequency layers are noncontiguous from each other frequency layer.

Aspect 7. The apparatus of any one of aspects 5 or 6, wherein the plurality of frequency layers form a plurality of groups of frequency layers, a frequency layer of the plurality of frequency layers being noncontiguous with a group of the plurality of groups of frequency layers.

Aspect 8. The apparatus of any one of aspects 1 to 7, wherein the at least one processor is configured to receive a request for the preferred bandwidth configuration from a base station.

Aspect 9. An apparatus comprising: at least one memory; a transceiver; and at least one processor coupled to the at least one memory, the at least one processor being configured to: receive, via the transceiver, one or more indications of a preferred bandwidth configuration for signaling consideration transmitted by a user equipment; determine a positioning configuration indicating disjoint bandwidth segments containing a positioning reference signal based on the preferred bandwidth configuration; and provide, via the transceiver, the positioning configuration indicating the disjoint bandwidth segments to the user equipment for the user equipment to determine one or more positioning measurements based on the positioning reference signal in the disjoint bandwidth segments.

Aspect 10. The apparatus of aspect 9, wherein the preferred bandwidth configuration is a bandwidth combination preference that includes a list of preferred carrier bands.

Aspect 11. The apparatus of any one of aspects 9 or 10, wherein the preferred bandwidth configuration is a numerology preference that includes comb and symbol information across frequency layers.

Aspect 12. The apparatus of any one of aspects 9 to 11, wherein the preferred bandwidth configuration is a timing error tolerance preference.

Aspect 13. The apparatus of any one of aspects 9 to 12, wherein the disjoint bandwidth segments include a plurality of frequency layers.

Aspect 14. The apparatus of aspect 13, wherein each frequency layer of the plurality of frequency layers are noncontiguous from each other frequency layer.

Aspect 15. The apparatus of any one of aspects 13 or 14, wherein the plurality of frequency layers form a plurality of groups of frequency layers, a frequency layer of the plurality of frequency layers being noncontiguous with a group of the plurality of groups of frequency layers.

Aspect 16. The apparatus of any one of aspects 9 to 15, wherein the at least one processor is configured to provide a request for the preferred bandwidth configuration to the user equipment.

Aspect 17. An apparatus comprising: at least one memory; a transceiver; and at least one processor coupled to the at least one memory, the at least one processor being configured to: receive, via the transceiver, an indication of phase coherence of a plurality of reference signals associated with a plurality of bandwidth segments; determine whether to aggregate a reference signal associated with each bandwidth segment of the plurality of bandwidth segments based on the indication of the phase coherence; and in response to a determination to aggregate the reference signal associated with each bandwidth segment, determine one or more positioning measurements based on an aggregated reference signal from the plurality of bandwidth segments.

Aspect 18. The apparatus of aspect 17, wherein the indication of the phase coherence includes a list of Boolean indicators of pairs of frequency layers, the list of Boolean indicators including one or more bitmaps associated with the pairs of the frequency layers.

Aspect 19. The apparatus of any one of aspects 17 to 18, wherein the indication of the phase coherence includes a bit array of a plurality of frequency layers, the plurality of frequency layers being sorted from low frequency to high frequency.

Aspect 20. The apparatus of any one of aspects 17 to 19, wherein the plurality of bandwidth segments include a plurality of frequency layers.

Aspect 21. The apparatus of aspect 20, wherein each frequency layer of the plurality of frequency layers are noncontiguous from each other frequency layer.

Aspect 22. The apparatus of any one of aspects 20 or 21, wherein the plurality of frequency layers form a plurality of groups of frequency layers, a frequency layer of the plurality of frequency layers being noncontiguous with a group of the plurality of groups of frequency layers.

Aspect 23. The apparatus of any one of aspects 17 to 22, wherein the plurality of frequency layers includes consecutive and noncontiguous frequency layers.

Aspect 24. An apparatus comprising: at least one memory; a transceiver; and at least one processor coupled to the at least one memory, the at least one processor being configured to: determine an indication of phase coherence of a plurality of reference signals associated with a plurality of bandwidth segments; transmit, via the transceiver, the indication of the phase coherence of the plurality of reference signals for wireless positioning, each bandwidth segment of the plurality of bandwidth segments being associated with a reference signal of the plurality of reference signals; and receive, via the transceiver, one or more positioning measurements based on an aggregated reference signal from the plurality of bandwidth segments, the aggregated reference signal being determined by a user equipment based on the indication of the phase coherence.

Aspect 25. The apparatus of aspect 24, wherein the indication of the phase coherence includes a list of Boolean indicators of pairs of frequency layers, the list of Boolean indicators including bitmaps of the pairs of the frequency layers.

Aspect 26. The apparatus of any one of aspects 24 or 25, wherein the indication of the phase coherence includes a bit array of a plurality of frequency layers, the plurality of frequency layers being sorted from low frequency to high frequency.

Aspect 27. The apparatus of any one of aspects 24 to 26, wherein the plurality of bandwidth segments include a plurality of frequency layers.

Aspect 28. The apparatus of aspect 27, wherein each frequency layer of the plurality of frequency layers are noncontiguous from each other frequency layer.

Aspect 29. The apparatus of any one of aspects 27 or 28, wherein the plurality of frequency layers form a plurality of groups of frequency layers, a frequency layer of the plurality of frequency layers being noncontiguous with a group of the plurality of groups of frequency layers.

Aspect 30. The apparatus of any one of aspects 24 to 29, wherein the plurality of frequency layers includes consecutive and noncontiguous frequency layers.

Aspect 31. A method comprising operations of any of aspects 1-30.

Aspect 32. A computer readable storage medium comprising instructions that, when executed by one or more processors of a device, cause the one or more processors to perform the operations of any of aspects 1-30.

Aspect 33. An apparatus comprising one or more means for performing any of the operations of aspects 1-30.

What is claimed is:

1. An apparatus for determining positioning, comprising:
at least one memory;
a transceiver; and
at least one processor coupled to the at least one memory, the at least one processor being configured to:
transmit, via the transceiver, one or more indications of a preferred bandwidth configuration, the preferred bandwidth configuration indicating at least one of preferences or processing capabilities of the apparatus for processing one or more sets of disjoint bandwidth segments;
receive, via the transceiver, a positioning configuration indicating disjoint bandwidth segments containing a positioning reference signal based on the preferred bandwidth configuration; and
determine one or more positioning measurements based on the positioning reference signal in the disjoint bandwidth segments.

2. The apparatus of claim 1, wherein the preferred bandwidth configuration is a bandwidth combination preference that includes a list of preferred carrier bands.

3. The apparatus of claim 1, wherein the preferred bandwidth configuration is a numerology preference that includes comb and symbol information across frequency layers.

4. The apparatus of claim 1, wherein the preferred bandwidth configuration is a timing error tolerance preference.

5. The apparatus of claim 1, wherein the disjoint bandwidth segments include a plurality of frequency layers.

6. The apparatus of claim 5, wherein each frequency layer of the plurality of frequency layers are noncontiguous from each other frequency layer.

7. The apparatus of claim 5, wherein the plurality of frequency layers form a plurality of groups of frequency layers, a frequency layer of the plurality of frequency layers being noncontiguous with a group of the plurality of groups of frequency layers.

8. The apparatus of claim 1, wherein the at least one processor is configured to receive a request for the preferred bandwidth configuration from a base station.

9. The apparatus of claim 1, wherein the at least one of the preferences or the processing capabilities of the apparatus is based on one or more algorithms the apparatus is able to use for processing the one or more sets of disjoint bandwidth segments.

10. A method of determining positioning, comprising:
transmitting, via a transceiver of a user equipment, one or more indications of a preferred bandwidth configuration, the preferred bandwidth configuration indicating at least one of preferences or processing capabilities of the user equipment for processing one or more sets of disjoint bandwidth segments;

receiving, via the transceiver, a positioning configuration indicating disjoint bandwidth segments containing a positioning reference signal based on the preferred bandwidth configuration; and determining one or more positioning measurements based on the positioning reference signal in the disjoint bandwidth segments.

11. The method of claim 10, wherein the preferred bandwidth configuration is a bandwidth combination preference that includes a list of preferred carrier bands.

12. The method of claim 10, wherein the preferred bandwidth configuration is a numerology preference that includes comb and symbol information across frequency layers.

13. The method of claim 10, wherein the preferred bandwidth configuration is a timing error tolerance preference.

14. The method of claim 10, wherein the disjoint bandwidth segments include a plurality of frequency layers.

15. The method of claim 14, wherein each frequency layer of the plurality of frequency layers are noncontiguous from each other frequency layer.

16. The method of claim 14, wherein the plurality of frequency layers form a plurality of groups of frequency layers, a frequency layer of the plurality of frequency layers being noncontiguous with a group of the plurality of groups of frequency layers.

17. The method of claim 10, further comprising receiving, via the transceiver, a request for the preferred bandwidth configuration from a base station.

18. The method of claim 10, wherein the at least one of the preferences or the processing capabilities of the user equipment is based on one or more algorithms the user equipment is able to use for processing the one or more sets of disjoint bandwidth segments.

19. An apparatus for determining positioning, comprising:

at least one memory;

a transceiver; and at least one processor coupled to the at least one memory, the at least one processor being configured to:

receive, via the transceiver, one or more indications of a preferred bandwidth configuration for signaling consideration transmitted by a user equipment, the preferred bandwidth configuration indicating at least one of preferences or processing capabilities of the user equipment for processing one or more sets of disjoint bandwidth segments;

determine a positioning configuration indicating disjoint bandwidth segments containing a positioning reference signal based on the preferred bandwidth configuration; and provide, via the transceiver, the positioning configuration indicating the disjoint bandwidth segments to the user equipment for the user equipment to determine one or more positioning measurements based on the positioning reference signal in the disjoint bandwidth segments.

20. The apparatus of claim 19, wherein the preferred bandwidth configuration is a bandwidth combination preference that includes a list of preferred carrier bands.

21. The apparatus of claim 19, wherein the preferred bandwidth configuration is a numerology preference that includes comb and symbol information across frequency layers.

22. The apparatus of claim 19, wherein the preferred bandwidth configuration is a timing error tolerance preference.

23. The apparatus of claim 19, wherein the disjoint bandwidth segments include a plurality of frequency layers.

24. The apparatus of claim 23, wherein each frequency layer of the plurality of frequency layers are noncontiguous from each other frequency layer.

25. The apparatus of claim 23, wherein the plurality of frequency layers form a plurality of groups of frequency layers, a frequency layer of the plurality of frequency layers being noncontiguous with a group of the plurality of groups of frequency layers.

26. The apparatus of claim 19, wherein the at least one processor is configured to provide a request for the preferred bandwidth configuration to the user equipment.

27. The apparatus of claim 19, wherein the at least one of the preferences or the processing capabilities of the apparatus is based on one or more algorithms the apparatus is able to use for processing the one or more sets of disjoint bandwidth segments.

28. A method of determining positioning, comprising:

receiving, via a transceiver, one or more indications of a preferred bandwidth configuration for signaling consideration transmitted by a user equipment, the preferred bandwidth configuration indicating at least one of preferences or processing capabilities of the user equipment for processing one or more sets of disjoint bandwidth segments;

determining a positioning configuration indicating disjoint bandwidth segments containing a positioning reference signal based on the preferred bandwidth configuration; and providing, via the transceiver, the positioning configuration indicating the disjoint bandwidth segments to the user equipment for the user equipment to determine one or more positioning measurements based on the positioning reference signal in the disjoint bandwidth segments.

29. The method of claim 28, wherein the preferred bandwidth configuration is at least one of a bandwidth combination preference that includes a list of preferred carrier bands, a numerology preference that includes comb and symbol information across frequency layers, or a timing error tolerance preference.

30. The method of claim 28, wherein the disjoint bandwidth segments include a plurality of frequency layers, and wherein each frequency layer of the plurality of frequency layers are noncontiguous from each other frequency layer.

* * * * *